(12) United States Patent
Olson et al.

(10) Patent No.: US 12,063,074 B2
(45) Date of Patent: *Aug. 13, 2024

(54) FIBER CUT/FAULT LOCALIZATION USING DIGITAL SUBCARRIERS

(71) Applicant: Infinera Corp., San Jose, CA (US)

(72) Inventors: Magnus Olson, Järfälla (SE); Amir Rashidinejad, Kanata (CA); Jia Ge, San Jose, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,253

(22) Filed: Aug. 3, 2022

(65) Prior Publication Data

US 2024/0048246 A1 Feb. 8, 2024

Related U.S. Application Data

(63) Continuation of application No. 17/817,234, filed on Aug. 3, 2022.

(51) Int. Cl.
*H04B 10/63* (2013.01)
*H04B 10/40* (2013.01)
*H04W 72/0453* (2023.01)

(52) U.S. Cl.
CPC ............. *H04B 10/63* (2013.01); *H04B 10/40* (2013.01); *H04W 72/0453* (2013.01)

(58) Field of Classification Search
CPC ........ H04B 10/63; H04B 10/40; H04B 17/10; H04B 17/101; H04B 17/103; H04B 17/104; H04B 17/15; H04B 17/17; H04B 17/18; H04B 10/50; H04B 10/61; H04B 10/03; H04B 10/035; H04B 10/071; H04B 10/07; H04B 10/075; H04B 10/0771; H04B 10/0779; H04B 10/58; H04B 10/572; H04B 10/564; H04B 10/0775; H04W 72/0453

See application file for complete search history.

(56) References Cited

U.S. PATENT DOCUMENTS

| | | | | |
|---|---|---|---|---|
| 2004/0208523 A1* | 10/2004 | Carrick | ................ | H04B 10/071 398/32 |
| 2012/0224846 A1* | 9/2012 | Swanson | ................ | H04B 10/85 398/13 |
| 2015/0229389 A1* | 8/2015 | Kim | .................. | H04B 10/0773 398/17 |
| 2022/0131605 A1* | 4/2022 | Edirisinghe | ............ | H04B 10/50 |

* cited by examiner

Primary Examiner — Hibret A Woldekidan
(74) Attorney, Agent, or Firm — David L. Soltz

(57) ABSTRACT

A method is described in which a coherent transmitter transmits a first optical signal having customer data through a fiber optic link. A control signal is provided to the coherent transmitter to cause the coherent transmitter to transmit a second optical signal devoid of customer data. A reflection of the second optical signal is detected via the coherent receiver. Then, a chromatic dispersion of the reflection of the second optical signal is determined and correlated with known parameters indicative of an amount of chromatic dispersion per unit length of the fiber optic link to determine a distance travelled by the second optical signal.

18 Claims, 9 Drawing Sheets

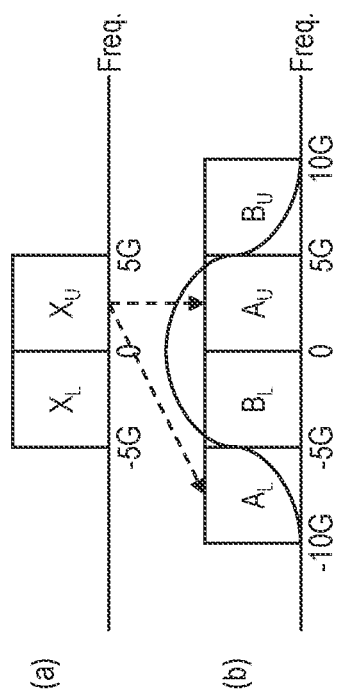
FIG. 6
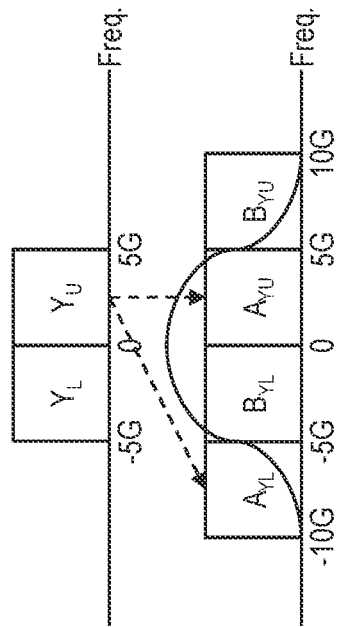
FIG. 7
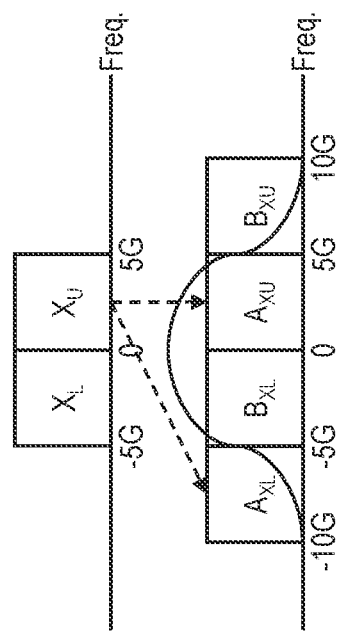

FIBER CUT/FAULT LOCALIZATION USING DIGITAL SUBCARRIERS

CROSS REFERENCE TO RELATED APPLICATION

This application is a continuation of U.S. Ser. No. 17/817,234 filed on Aug. 3, 2022, which claims the benefit of U.S. Provisional Patent Application No. 63/228,923, filed on Aug. 3, 2021, the contents of which are incorporated herein by reference in their entirety.

BACKGROUND

Coherent optical communication systems have been developed that provide distinct advantages over more traditional direct detection schemes. In a coherent optical communication receiver, the optical phase and amplitude of a transmitted optical signal can be detected, thus enabling the use of multilevel modulation schemes to increase optical fiber spectral efficiency. Coherent detection provides another advantage over direct detection in that linear impairments of the transmitted optical signal can be compensated for in the receiver using digital filters and other known digital compensation techniques.

Some important linear impairments that can affect the performance of optical communication systems include a form of signal distortion resulting from chromatic dispersion ("CD") of the optical signal. The transmitted optical signal has a finite spectral width such that the spectral components may be transmitted at different frequencies. Chromatic dispersion is a result of the different spectral components propagating at different speeds along the fiber, resulting in an undesirable temporal spreading of the optical signal.

Optical communication systems generally include a number of links of optical fibers and optical system components, each contributing to the overall chromatic dispersion of received signals. Unfortunately, the optical fibers are physical systems that can be cut or broken due to natural or accidental causes. For example, the optical fibers can be cut by natural ground movement (e.g., earthquakes) or accidentally (e.g., by backhoes). When this happens, it is not always apparent where the cut or break occurred. Thus, significant resources may be expended locating the cut or break prior to repair.

Optical time domain reflectometry ("OTDR") and optical frequency domain reflectometry ("OTFR") are methods of characterizing optical links in an optical network. OTDR and/or OTFR are generally used for diagnosing faults, bends, and losses in optical fibers. However, doing so generally requires installing external equipment that is specifically designed for that purpose. Furthermore, OTDR and OFDR are typically performed out-of-band, where certain optical devices (e.g., amplifiers) do not necessarily function, which obfuscates the accuracy of the characterization. Finally, OTDR and OTFR are typically slow in relation to the other work of optical networks. Accordingly, it would be beneficial to be able to quickly and accurately locate a cut or break in an optical fiber without the need for external equipment.

SUMMARY

The problem of determining a location of a fiber cut or fault is solved by coherent transceivers and methods of using the same as described herein. A coherent transceiver comprises a coherent transmitter and a coherent receiver, the coherent transmitter being operable to transmit a first optical signal, and the coherent receiver being operable to receive a second optical signal. The coherent receiver comprises a processor executing processor-executable code that when executed causes the processor to perform a fiber cut/fault localization method. The coherent transmitter has a known first location. The second optical signal is a reflection of the first optical signal. The fiber cut/fault localization method comprises the steps of: transmitting the first optical signal; receiving the second optical signal; analyzing the second optical signal to determine a first parameter; determining a second parameter based on the first parameter; determining a second location of a fault; and generating a message. The first parameter is indicative of a chromatic dispersion of the second optical signal. The second parameter is indicative of a distance traveled by the first optical signal and the second optical signal through one or more fiber optic link. The second location is determined by correlating the second parameter with the known first location. The message is indicative of the second location. In response to receiving the message, a technician is deployed to the second location in order to repair the fault.

In one embodiment, the first optical signal comprises one or more first data subcarrier and a first auxiliary subcarrier, the second optical signal comprises one or more second data subcarrier and a second auxiliary subcarrier, and the processor-executable code when executed further causes the processor to detect a fault in the one or more fiber optic link; and adjust an auxiliary baud rate of the first auxiliary subcarrier in response to detecting the fault in the one or more fiber optic link; wherein the step of analyzing the second optical signal comprises analyzing the second auxiliary subcarrier of the second optical signal.

In another embodiment, the first optical signal comprises one or more first data subcarrier and a first auxiliary subcarrier, the second optical signal comprises one or more second data subcarrier and a second auxiliary subcarrier, the one or more first data subcarrier has a data baud rate, the first auxiliary subcarrier has an auxiliary baud rate different from the data baud rate, and the step of analyzing the second optical signal comprises analyzing the second auxiliary subcarrier of the second optical signal.

In another aspect, the present disclosure relates to a method comprising the steps of: transmitting a first optical signal; receiving a second optical signal; analyzing the second optical signal to determine a first parameter; and determining a second parameter based on the first parameter. The second optical signal is a reflection of the first optical signal. The first parameter is indicative of a chromatic dispersion of the second optical signal. The second parameter is indicative of a distance traveled by the first optical signal and the second optical signal through one or more fiber optic link.

In another aspect, the present disclosure relates to a method, comprising: transmitting, by a coherent transmitter, a first optical signal having customer data through a fiber optic link; providing a control signal to the coherent transmitter to cause the coherent transmitter to transmit a second optical signal devoid of customer data; detecting a reflection of the second optical signal via the coherent receiver; determining a chromatic dispersion of the reflection of the second optical signal; and correlating the chromatic dispersion with known parameters indicative of an amount of chromatic dispersion per unit length of the fiber optic link to determine a distance travelled by the second optical signal.

In another aspect, the present disclosure relates to a coherent transceiver comprising a coherent transmitter, a coherent receiver, and a controller. The coherent transmitter is operable to transmit a first optical signal having customer data through a fiber optic link. The controller comprises a processor and a non-transitory computer readable medium storing processor executable code that when executed causes the processor to: provide a control signal to the coherent transmitter to cause the coherent transmitter to transmit a second optical signal devoid of customer data; detect a reflection of the second optical signal via the coherent receiver; determine a chromatic dispersion of the reflection of the second optical signal; and correlate the chromatic dispersion with known parameters indicative of an amount of chromatic dispersion per unit length of the fiber optic link to determine a distance travelled by the second optical signal.

In yet another aspect, the present disclosure describes a method comprising transmitting, by a coherent transmitter, a first optical signal having customer data through a fiber optic link in a normal mode of operation of the coherent transmitter, the customer data encoded in at least one data subcarrier of the first optical signal; detecting a fault in the fiber optic link; switching the coherent transmitter to a fault detection mode; detecting a reflection of the second optical signal via a coherent receiver; determining a chromatic dispersion of the reflection of the second optical signal; and correlating the chromatic dispersion with known parameters indicative of an amount of chromatic dispersion per unit length of the fiber optic link to determine a distance travelled by the second optical signal.

The details of one or more implementations of the subject matter of this specification are set forth in the accompanying drawings and the description below. Other aspects, features and advantages will become apparent from the description, the drawings, and the claims.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 6 is a diagram of a sample signal spectrum used to demonstrate the concept of CD estimation consistent with an aspect of the present disclosure;

FIG. 7 is a diagram of a sample signal spectrum of a polarization multiplexed signal used to estimate the CD consistent with an aspect of the present disclosure;

DETAILED DESCRIPTION

Figure 1:
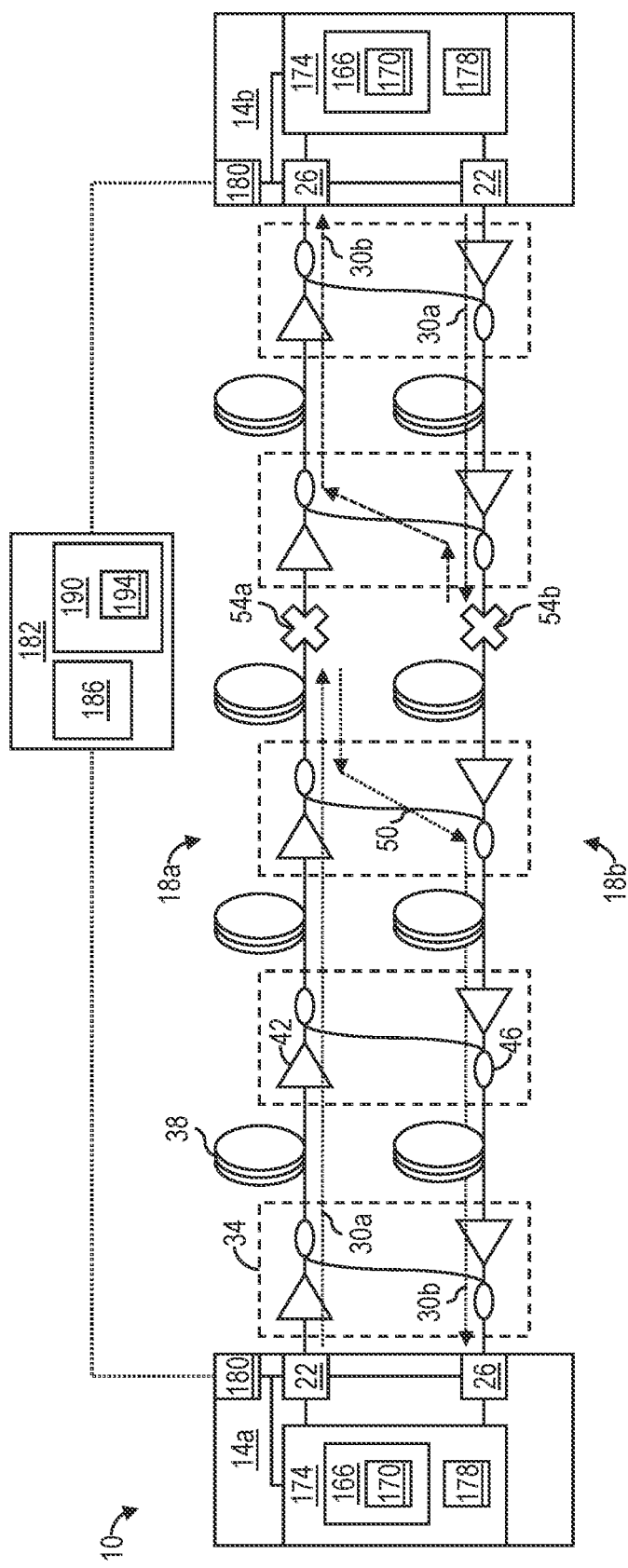
FIG. 1 is a block diagram of an exemplary embodiment of a dual-fiber optical network constructed in accordance with the present disclosure.

The following detailed description of example embodiments refers to the accompanying drawings. The same reference numbers in different drawings may identify the same or similar elements.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure, or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value.

When values are expressed as approximations, e.g., by use of the antecedent "about," it will be understood that the particular value forms another embodiment. Reference to a particular numerical value includes at least that particular value, unless the context clearly dictates otherwise. The term "about" when used in reference to numerical ranges, cutoffs, or specific values is used to indicate that the recited values may vary by up to as much as 10% from the listed value. Thus, the term "about" is used to encompass variations of ±10% or less, variations of ±5% or less, variations of ±1% or less, variations of ±0.5% or less, or variations of ±0.1% or less from the specified value.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instruction that when executed by one or more component, e.g., a processor, causes the component to perform a specified function. It should be understood that the algorithms described herein may be stored on one or more non-transitory computer-readable medium. Exemplary non-transitory computer-readable media may include random access memory (RAM), a read only memory (ROM), a CD-ROM, a hard drive, a solid-state drive, a flash drive, a memory card, a DVD-ROM, a Blu-ray Disk, a disk, an optical drive, combinations thereof, and/or the like.

Such non-transitory computer-readable media may be electrically based, optically based, magnetically based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

As used herein, a "route" and/or an "optical route" may correspond to an optical path and/or an optical light-path. For example, an optical route may specify a path along which light is carried between two or more network entities.

As used herein, an optical link may be one or more optical fiber and associated hardware, such as one or more optical repeater, carrying one or more of an optical channel, an optical super-channel (e.g., multiple optical channels that are routed together), a super-channel group, an optical carrier group, a set of spectral slices, an optical control channel (e.g., sometimes referred to herein as an optical supervisory channel, or an "OSC"), and an optical data channel (e.g., sometimes referred to herein as "BAND").

In some implementations, an optical link may include an optical fiber carrying an optical super-channel. A super-channel may include multiple channels multiplexed together using wavelength-division multiplexing in order to increase transmission capacity. Various quantities of channels may be combined into super-channels using various modulation formats to create different super-channel types having different characteristics. Additionally, or alternatively, an optical link may include an optical fiber carrying a super-channel group. A super-channel group may include multiple super-channels multiplexed together using wavelength-division multiplexing in order to increase transmission capacity.

Additionally, or alternatively, an optical link may include an optical fiber carrying a set of spectral slices. A spectral slice (a "slice") may represent a spectrum of a particular size in a frequency band (e.g., 12.5 gigahertz ("GHz"), 6.25 GHz, etc.). For example, a 4.8 terahertz ("THz") frequency band may include 384 spectral slices, where each spectral slice may represent 12.5 GHz of the 4.8 THz spectrum. A super-channel may include a different quantity of spectral slices depending on the super-channel type.

Figure 2:
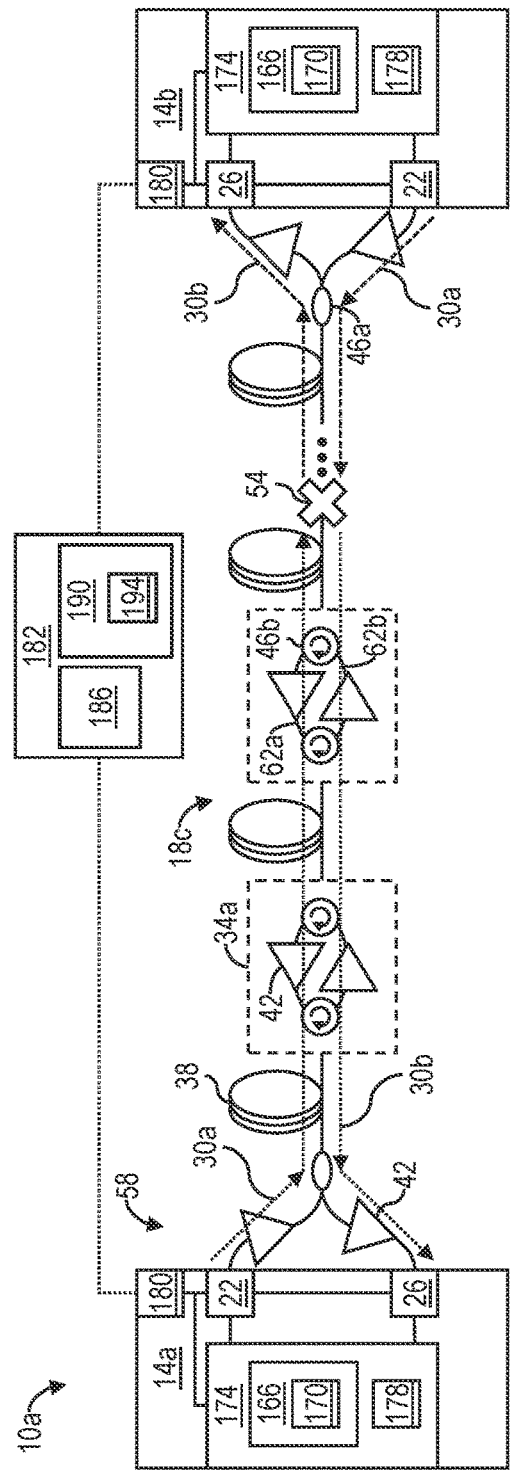
FIG. 2 is a block diagram of an exemplary embodiment of a bidirectional optical network constructed in accordance with the present disclosure.

Referring now to drawings, and in particular to FIG. 1, shown therein is a block diagram of an exemplary embodiment of an optical network 10 constructed in accordance with the present disclosure. In the embodiment shown in FIG. 1, the optical network 10 is a dual-fiber optical network 10 comprising a plurality of coherent transceivers 14 (hereinafter "coherent transceivers 14") (e.g., a first coherent transceiver 14a and a second coherent transceiver 14b) optically connected to each other via one or more optical link 18 (hereinafter "optical links 18") (e.g., a downlink 18a, an uplink 18b, and/or a bidirectional (i.e., single-fiber) link 18c, as shown in FIG. 2). The coherent transceivers 14 may be normal coherent transceivers or high-speed coherent transceivers. Each of the coherent transceivers 14 is generally provided with a coherent transmitter module 22 and a coherent receiver module 26. People having ordinary skill in the art will understand that the optical network 10 constructed in accordance with the present disclosure may comprise any number of additional optical devices (e.g., optical routers, ROADMs, other line systems, etc.), which may include Chromatic Dispersion compensation elements.

The coherent transmitter module 22 may be operable to transmit a first optical signal 30a, and the coherent receiver module 26 may be operable to receive a second optical signal 30b. The second optical signal 30b may be a reflection of the first optical signal 30a. As shown in FIG. 1, the first coherent transceiver 14a may use the coherent transmitter module 22 to transmit the first optical signal 30a via the downlink 18a and the coherent receiver module 26 to receive the second optical signal 30b via the uplink 18b. Conversely, the second coherent transceiver 14b may use the coherent transmitter module 22 to transmit the first optical signal 30a via the uplink 18b and the coherent receiver module 26 to receive the second optical signal 30b via the downlink 18a.

Each of the optical links 18 may comprise one or more optical repeater 34 (hereinafter "optical repeaters 34") and one or more optical fiber referred to herein as a fiber span 38 (hereinafter "fiber spans 38"). Each of the optical repeaters 34 may be provided with, for example, two or more optical amplifiers 42 (hereinafter "optical amplifiers 42"), two or more optical multiplexers/demultiplexers 46 (hereinafter "optical mux/demuxes 46"), and/or a reflection path 50. For purposes of brevity, only one of each of the optical repeaters 34, the fiber spans 38, the optical amplifiers 42, the optical mux/demuxes 46, and the reflection paths 50 are labeled with reference characters.

While the optical mux/demuxes 46 are depicted as splitters (or "couplers") in FIG. 1, persons having ordinary skill in the art will understand that the optical mux/demuxes 46 may be any optical multiplexing/demultiplexing device that is capable of performing the invention as described herein (e.g., an optical coupler, an optical splitter, and/or an optical circulator as shown in FIG. 3).

The first optical signal 30a, having been transmitted by the coherent transmitter module 22 of the first coherent transceiver 14a via the downlink 18a, may encounter a fault 54a (e.g., a fault or a cut) in the fiber optic cable. Upon encountering the fault 54a, the first optical signal 30a may be reflected, and the second optical signal 30b may traverse the reflection path 50 of the optical repeater 34 positioned nearest to the fault 54a in order to be received by the coherent receiver module 26 of the first coherent transceiver 14a via the uplink 18b. Conversely, the first optical signal 30a, having been transmitted by the coherent transmitter module 22 of the second coherent transceiver 14b via the uplink 18b, upon encountering a fault 54b in the fiber optic cable, may be reflected, and the second optical signal 30b may traverse the reflection path 50 of the optical repeater 34 positioned nearest to the fault 54b in order to be received by the coherent receiver module 26 of the second coherent transceiver 14b via the downlink 18a.

Referring now to FIG. 2, shown therein is a block diagram of another exemplary embodiment of the optical network 10 shown in FIG. 1. In the embodiment shown in FIG. 2, the optical network 10 is a bidirectional (i.e., single-fiber) optical network 10a comprising a bidirectional optical link 18c. The bidirectional optical link 18c may comprise one or more bidirectional optical repeater 34a (hereinafter "bidirectional optical repeaters 34a"), one or more fiber span 38, two or more optical amplifiers 42, and/or two or more optical mux/demuxes 46a (depicted in FIG. 2 as optical splitters 46a). Each of the bidirectional optical repeaters 34a may be provided with, for example, two or more optical amplifiers 42, one or more optical mux/demuxes 46 (depicted in FIG. 2 as optical circulators 46b) at each coherent transceiver site 58, and/or two or more optical sub-links 62 (e.g., a first optical sub-link 62a and a second optical sub-link 62b). Each of the optical circulators 46b may comprise three or more ports, at least three of the three or more ports being optically connected to the first optical sub-link 62a, the bidirectional optical link 18c, and the second optical sub-link 62b. For purposes of brevity, only one of each of the bidirectional optical repeaters 34a, the fiber spans 38, the optical amplifiers 42, the optical splitters 46a, the optical circulators 46b, the coherent transceiver sites 58, the first optical sub-link 62a, and the second optical sub-link 62b are labeled with reference characters.

In the bidirectional optical network 10a, both of the coherent transceivers 14a, 14b may use the coherent transmitter module 22 to transmit the first optical signal 30a and the coherent receiver module 26 to receive the second optical signal 30b, wherein the first optical signal 30a and the second optical signal 30b are respectively transmitted and received via the bidirectional optical link 18c.

The first optical signal 30a, having been transmitted by the coherent transmitter module 22 of the coherent transceiver 14a via the bidirectional optical link 18c, may encounter the fault 54 in the fiber optic cable. Upon encountering the fault 54, the first optical signal 30a may be reflected, and the second optical signal 30b may traverse one or more of the bidirectional optical repeaters 34a in order to be received by the coherent receiver module 26 of the coherent transceiver 14a via the bidirectional optical link 18c. Conversely, the first optical signal 30a, having been transmitted by the coherent transmitter module 22 of the coherent transceiver 14b via the bidirectional optical link 18c, upon encountering the fault 54, may be reflected, and the second optical signal 30b may traverse one or more of the bidirectional optical repeaters 34a in order to be received by the coherent receiver module 26 of the coherent transceiver 14b via the bidirectional optical link 18c.

Figure 3A:
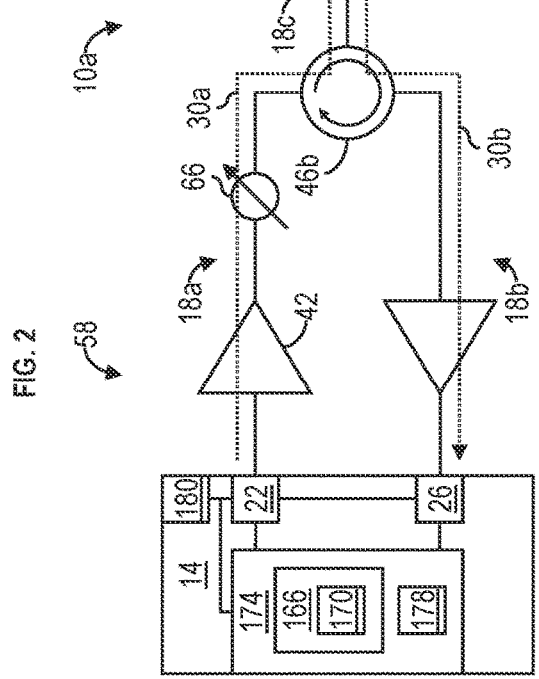
FIG. 3A is a block diagram of an exemplary embodiment of a coherent transceiver site constructed in accordance with the present disclosure.

Referring now to FIG. 3A, shown therein is a block diagram of an exemplary embodiment of a coherent transceiver site 58 constructed in accordance with the present disclosure. In the embodiment shown in FIG. 3, the coherent transceiver 14 of the coherent transceiver site 58 belongs to a bidirectional optical network 10a comprising a downlink 18a, an uplink 18b, and a bidirectional optical link 18c, each of the optical links 18 being optically connected to one of the ports of the optical circulator 58. The downlink 18a may be provided with an optical amplifier 42 and a variable optical attenuator (hereinafter "VOA") 66, and the uplink 18b may be provided with an optical amplifier 42.

The first optical signal 30a, having been transmitted by the coherent transmitter module 22 of the coherent transceiver 14, may enter the optical circulator 58 via the downlink 18a in order to exit the optical circulator 58 via the bidirectional optical link 18c, before encountering the fault 54 (shown in FIG. 2) in the fiber optic cable. Upon encountering the fault 54 (shown in FIG. 2), the first optical signal 30a may be reflected, and the second optical signal 30b may enter the optical circulator 58 via the bidirectional optical link 18c in order to exit the optical circulator 58 via the uplink 18b, before being received by the coherent receiver module 26 of the coherent transceiver 14.

Figure 3B:
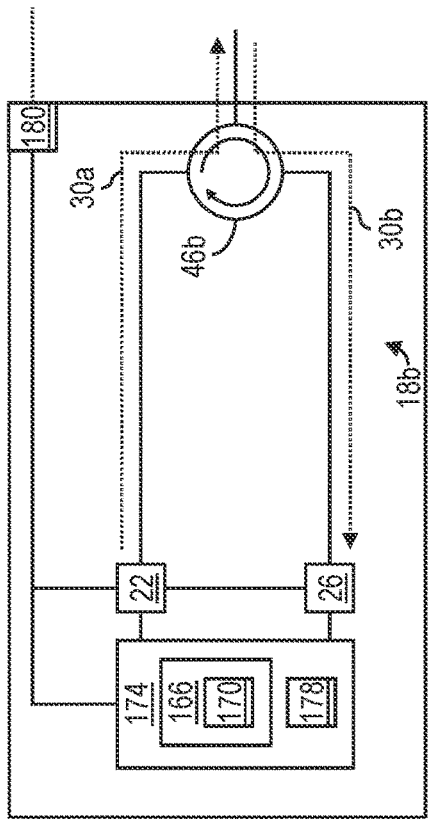
FIG. 3B is a block diagram of an exemplary embodiment of the coherent transceiver constructed in accordance with the present disclosure.
Figure 3C:
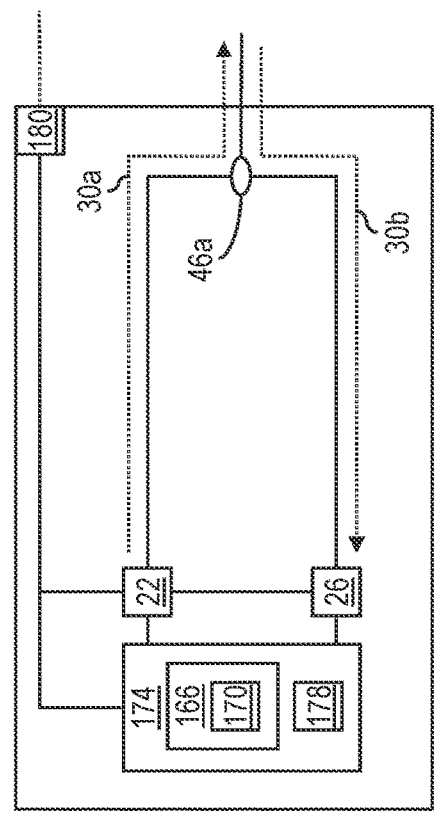
FIG. 3C is a block diagram of another exemplary embodiment of the coherent transceiver shown in FIG. 3B.

Shown in FIG. 3B is a block diagram of an exemplary embodiment of a coherent transceiver 14 constructed in accordance with the present disclosure. As shown in FIG. 3B, in certain embodiments, the mux/demux 46 (depicted as a circulator 46b in FIG. 3B) may be included within the coherent transceiver 14. Shown in FIG. 3C is a block diagram of another exemplary embodiment of the coherent transceiver 14 shown in FIG. 3B. As shown in FIG. 3C, in certain embodiments, the mux/demux 46 (depicted as an optical splitter 46a in FIG. 3C) may be included within the coherent transceiver 14. Persons having ordinary skill in the art will understand that the coherent transceiver 14 may comprise any number of additional optical modules, so long as the coherent transceiver 14 is capable of determining a chromatic dispersion.

Figure 4:
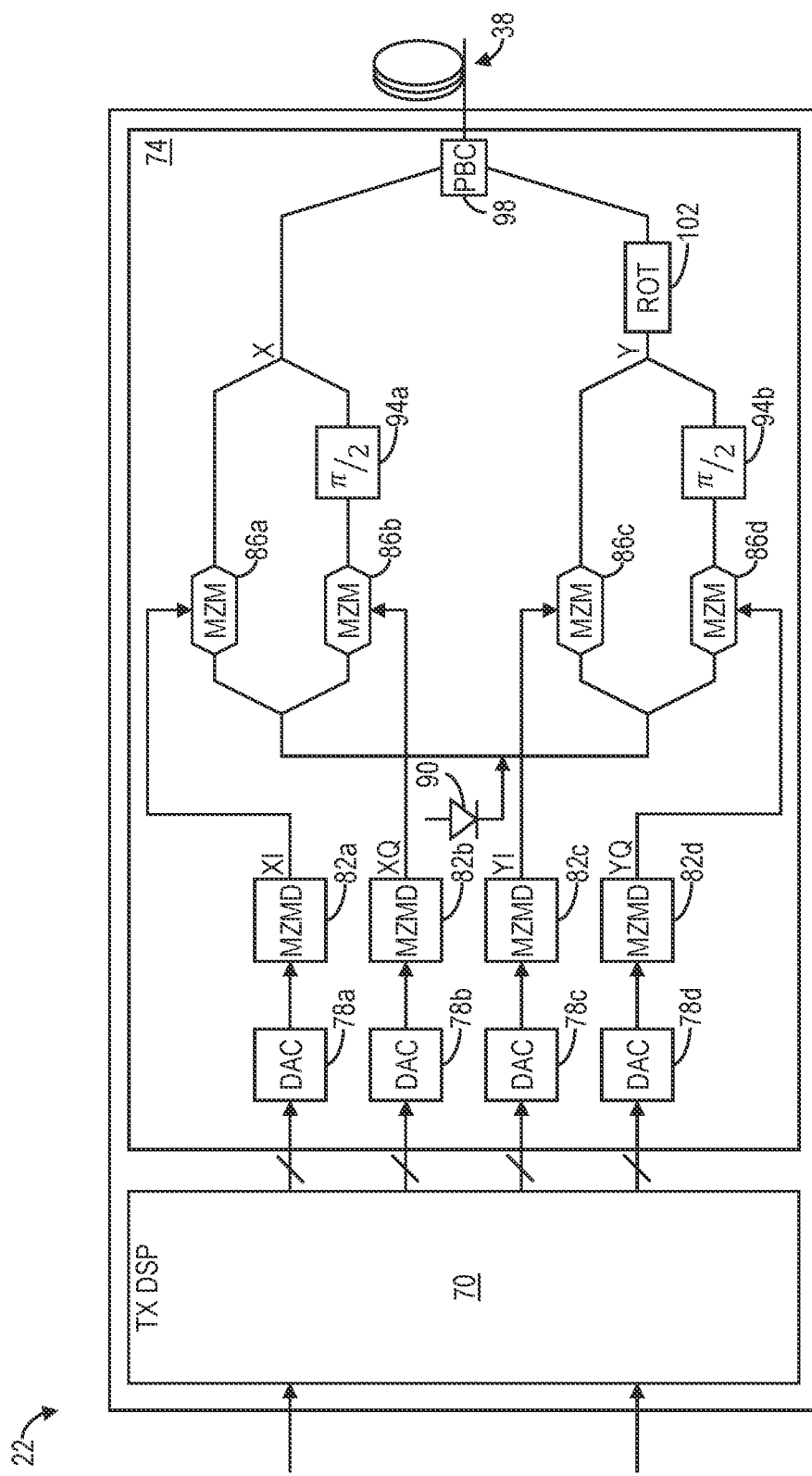
FIG. 4 is a block diagram of an exemplary embodiment of a coherent transmitter constructed in accordance with the present disclosure.

Referring now to FIG. 4, shown therein is a block diagram of an exemplary embodiment of a coherent transmitter module 22 constructed in accordance with the present disclosure. The coherent transmitter module 22 generally includes a transmitter DSP 70 (hereinafter "TX DSP 70") and a D/A and optics block 74. In one embodiment, the TX DSP 70 is implemented within a DSP ASIC. In one embodiment, the TX DSP 70 may supply a plurality of outputs to D/A and optics block 74 including digital-to-analog conversion circuits 78a-78d (hereinafter "DACs 78"), which convert a digital signal received from the TX DSP 70 into corresponding analog signals. D/A and optics block 74 also includes driver circuits 82a-82d that receive the analog signals from DACs 78 and adjust the voltages or other characteristics thereof to provide drive signals to a corresponding one of modulators 86a-86d (hereinafter "modulators 86").

D/A and optics block 74 further includes modulators 86, each of which may be, for example, a Mach-Zehnder modulator (hereinafter "MZM") that modulates the phase and/or amplitude of the light output from laser 90. As further shown in FIG. 4, light output from laser 90 is split such that a first portion of the light is supplied to a first modulator pairing, including modulators 86a and 86b, and a second portion of the light is supplied to a second modulator pairing, including modulators 86c and 86d. The first portion of the light is split further into third and fourth portions, such that the third portion is modulated by modulator 86a to provide an in-phase (I) component of an X (or TE) polarization component of a modulated optical signal, and the fourth portion is modulated by modulator 86b and fed to phase shifter 94a to shift the phase of such light by 90 degrees in order to provide a quadrature (Q) component of the X polarization component of the modulated optical signal. Similarly, the second portion of the light is further split into fifth and sixth portions, such that the fifth portion is modulated by modulator 86c to provide an I component of a Y (or TM) polarization component of the modulated optical signal, and the sixth portion is modulated by modulator 86d and fed to phase shifter 94b to shift the phase of such light by 90 degrees to provide a Q component of the Y polarization component of the modulated optical signal.

The optical outputs of modulators 86a and 86b are combined to provide an X polarized optical signal including I and Q components and are fed to a polarization beam combiner (PBC) 98. In addition, the outputs of modulators 86c and 86d are combined to provide an optical signal that is fed to polarization rotator 102, that rotates the polarization of such optical signal to provide a modulated optical signal having a Y (or TM) polarization. The Y polarized modulated optical signal also is provided to PBC 98, which combines the X and Y polarized modulated optical signals to provide a polarization multiplexed ("dual-pol") modulated optical signal onto a fiber span 38, which may be included as a segment of optical fiber in one of the optical links 18.

The polarization multiplexed optical signal output from D/A and optics block 74 includes subcarriers SC0-SC7 noted described below, such that each subcarrier has X and Y polarization components and I and Q components.

Figure 5:
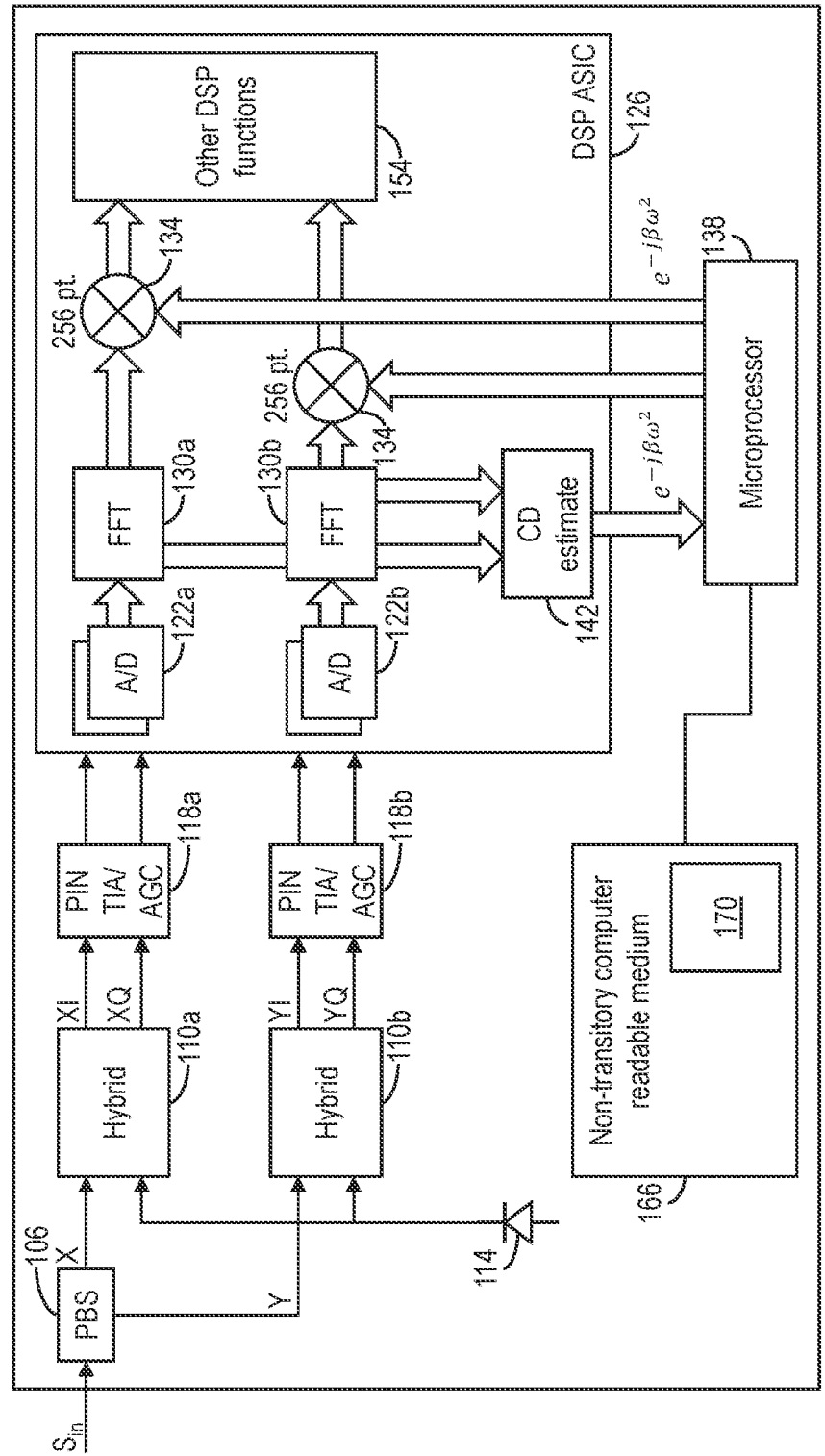
FIG. 5 is a block diagram of an exemplary embodiment of a coherent receiver constructed in accordance with the present disclosure.

Referring now to FIG. 5, shown therein is a block diagram of an exemplary embodiment of a coherent receiver module 26 constructed in accordance with the present disclosure. As shown, an incident optical signal $S_{in}$ is separated by a polarization beam splitter 106 (hereinafter "PBS 106") into first and second polarized signals of X and Y polarity, respectively. The polarized signals may be orthogonally polarized. The X polarity signal and the Y polarity signal are then respectively fed into two optical hybrids 110a and 110b (hereinafter "optical hybrids 110") together with a reference signal of a local oscillator optical signal output from a local oscillator laser 114. Each of the optical hybrids 110 supplies optical signals to detector circuits 118a and 118b (hereinafter "detector circuits 118"), each of which include known transimpedance amplifier and automatic gain control circuitry. Each of the detector circuits 118 produces two base-band electrical signals linearly proportional to the in-phase (I) and quadrature (Q) components of the optical E-field on the X and Y polarity signals, respectively (i.e. XI, XQ and YI, YQ). XI, XQ and YI, YQ are analog signals which are next fed to analog to digital converters circuits 122a and 122b (hereinafter "A/D circuits 122"), which may be within a digital signal processor ASIC 126 (hereinafter "RX DSP 126"). A/D circuits 122, in turn, output digital or digitized signals, as further shown in FIG. 5.

Because chromatic dispersion in optical communication systems can be represented by a linear function, in normal operation, compensation of chromatic dispersion in a receiver consistent with the disclosed embodiments can be readily implemented using a finite impulse response filter ("FIR") in the frequency domain, by determining an inverse frequency response of the chromatic dispersion. Accordingly, chromatic dispersion estimation techniques consistent with exemplary embodiments are performed effectively in the frequency domain where they can be demonstrated to be insensitive to polarization mode dispersion ("PMD"). Thus, according to the disclosed embodiments, a plurality of Fast Fourier Transform blocks or circuits 130a and 130b (hereinafter "FFT blocks 130") receive the digitized signals, supplied by A/D circuits 122, which are all in the time domain, and output signals which are in the frequency domain. As shown in FIG. 5, a first FFT block 130a is used to transform the X polarity signals and a second FFT block 130b is used to transform the Y polarity signals. For example, as depicted in FIG. 5, FFT blocks 130 have 256 outputs each, and thus may perform a 256 "point" transformation of the received signals, however, the present disclosure is not limited to this specific design and other methods of transforming the digital signals to the frequency domain could be used consistent with the present disclosure.

To demonstrate that exemplary methods of estimating chromatic dispersion according to the present disclosure are insensitive to PMD, a first embodiment of estimating chromatic dispersion in a coherent receiver module 26 will be explained with respect to FIG. 6. However, it will be understood by persons having ordinary skill in the art that estimating chromatic dispersion may be accomplished in other manner(s) while remaining consistent with the present disclosure. According to this first exemplary embodiment, a singularly polarized transmitted optical signal is processed in the receiver, as discussed above. A sample 10 Gbaud data spectrum of the singularly polarized transmitted signal is shown in FIG. 6(a). $X_U$ represents the random data spectrum in the upper side band of the X polarized transmitted signal, and $X_L$ represents the random data spectrum in the lower side band of the X polarized signal. To compensate for the chromatic dispersion in the optical communication system through which the polarized optical signal was transmitted, the exemplary method determines a phase difference between related frequency domain data of the received signal as a function of frequency. As discussed further below, the frequency domain data includes related data due to the up-sampling of the received signal, the data being related in that they include the same data spectrum. An illustrative up-sampled signal is shown in FIG. 6(b). In this illustrative example, the 10 Gbaud signal spectrum is up-sampled by twice the baud rate or baud frequency so that it now spans over 20 Gbaud. As a result of the up-sampling of the received signal shown in FIG. 6(a), the data from $X_U$ and $X_L$ is effectively copied as indicated by the dashed arrows in FIG. 6 the copied data being spectrally spaced from one another by a value indicative of the baud frequency. More particularly, in FIG. 6(b), $A_U$ and $A_L$ represent the same data spectrum as $X_U$, and $B_U$ and $B_L$ represent the same data spectrum as $X_L$. While the exemplary embodiments are described herein using a 2 times up-sampling rate (2 samples per symbol), in practice, the exemplary embodiments may be realized using any sampling rate at least equal to or greater than the transmit baud rate (i.e., greater than or equal to 1 sample per symbol).

In this first embodiment, it is assumed that the received signal is free from any PMD or other polarization rotation effects. Additionally, as shown in FIG. 6(b), the received signal may have been modulated using some amplitude function represented by the curve shown. For the purpose of estimating chromatic dispersion in this embodiment, however, the amplitude function is also ignored. Thus, with the above assumptions, the upper and lower side bands of the up-sampled signal may be modeled in the frequency domain using equations 1 and 2 (Eqn. 1, 2), below.

$$A_U(f_1) = X_U(f_1)e^{j\beta\omega_1^2}e^{-j\tau\cdot\omega_1} \quad \text{(Eqn. 1)}$$

$$A_L(f_2) = X_U(f_2)e^{j\beta\omega_2^2}e^{-j\tau\cdot\omega_2} \quad \text{(Eqn. 2)}$$

Where, $X_U(f)$ is the upper-side band (USB) data spectrum of the X polarity signal, $\beta$ is the chromatic dispersion coefficient, and $\tau$ is the clock phase. As discussed above, $A_U$ and $A_L$ comprise the same data, and they differ only by $\omega_1$ and $\omega_2$. In this example, $f_1(=\omega_1/2\pi)$ is from 0 to 5 GHz, and $f_2(=\omega_2/2\pi)$ is from $-10$ to $-5$ GHz (i.e., $f_2=f_1-10$ GHz. For simplicity, throughout the remainder of this disclosure, each pair of frequencies ($f_1$ and $f_2$) will be represented by the singular value f. Similar representations for $B_U$ and $B_L$, which are copies of the lower side band data spectrum of X, can be written using the expressions shown in Eqn. 1 and Eqn. 2, respectively, by substituting $X_L$ for $X_U$. In this embodiment, however, the exemplary method is demonstrated by modeling only the expression of $A_U$ and $A_L$ as further discussed below.

In the actual implementation at the receiver, data samples are received in "chunks" during each clock cycle. In this example, each data sample is processed by the FFT block 130a and corresponding frequency domain data is output. During each clock cycle, data processing by FFT block 130a can be modeled using Eqn. 1 and Eqn. 2 above. Because $\beta$ represents the chromatic dispersion coefficient of the received signal, it is this value that the exemplary method determines. Upon determining a value for $\beta$, the effects of chromatic dispersion can be compensated for in the receiver by multiplying the outputs of FFT block 130a by the inverse frequency response $e^{-j\beta\omega^2}$, as shown in FIG. 5.

The value for $\beta$ is determined by comparing the phase differences between $\omega_1$ and $\omega_2$ over a desired number of frequencies. This phase difference is determined by calculating the dot product between $A_U$ and the complex conjugate of $A_L$ for each related pair of FFT outputs represented by frequencies (e.g., $f_1$ and $f_2$) as shown in Eqn. 3 below. The resultant vector, however, may appear noisy due to the presence of the random data $X_U(f)$, and $\beta$ cannot easily be determined. It can be shown, however, that $|X_U(f)|^2$ over all frequencies from 0-5 Ghz averages to a value of 1. Due to the random nature of $X_U$, the noisy effects of $|X_U(f)|^2$ can be mitigated by calculating a time average of the dot product for each pair of frequencies over a desired number of clock cycles. For each clock cycle, the values for $\beta$, $\omega_1$ and $\omega_2$ for a selected pair of FFT 130a outputs ("frequency bins") remain the same. $X_U$, however, changes between clock cycles in each respective pair of frequency bins. Thus, averaging the dot product for each frequency pair over a predetermined period of time (i.e., over a number of clock cycles) preserves the phase information of the dot product while reducing the $|X_U(f)|^2$ data to a value of 1. The greater the number of clock cycles used in the averaging step, the closer $|X_U(f)|^2$ approaches 1. In this exemplary embodiment, the averaging step is performed for at least 64 clock cycles. The averaging, however, may be performed over any desired number of clock cycles, such as 4, 8, 16, 32, 64 or more, as discussed in greater detail below. The expression for the time average of the dot product for each frequency is shown by the angled brackets < > in Eqn. 3 below.

$$\langle A_U(f) \cdot A_L^*(f) \rangle = X_U(f)X_U^*(f) \cdot e^{j\beta\omega_1^2}e^{-j\tau\cdot\omega_1}e^{-j\beta\omega_2^2}e^{+j\tau\cdot\omega_2} \quad \text{(Eqn. 3)}$$

$$= |X_U(f)|^2 e^{j\beta(\omega_1^2-\omega_2^2)}e^{-j\tau\cdot(\omega_1-\omega_2)}$$

As discussed above, the magnitude of the data spectrum, $|X_U(f)|^2$, over a sufficient number of clock cycles becomes a scalar. Once the noisy effects of the data spectrum are removed, the phase difference of this time averaged quantity is more easily determined and is represented as $\beta(\omega_1^2-\omega_2^2)-\tau(\omega_1-\omega_2)$. In this illustrative example, $\omega_1-\omega_2=2\pi\cdot10$ GHz is a constant with respect to $\omega_1$, and $\omega_1^2-\omega_2^2$ is a linear function of $\omega_1$ or f. It follows then that the linear phase component, $\omega_1^2-\omega_2^2$ of the above quantity, is proportional to the chromatic dispersion coefficient $\beta$, and the DC constant portion of the quantity is proportional to the clock phase $\tau$.

From the above expression (Eqn. 3), the chromatic dispersion in the optical communication system may be estimated in accordance with an exemplary embodiment. Since the value for $\beta$ is proportional to the linear function of $\omega_1^2-\omega_2^2$, the value for $\beta$ is determined by calculating the linear slope of the time-averaged dot product in Eqn. 3 with respect to frequency. In other words, the value for $\beta$ can be calculated by determining the rate of change of the calculated phase differences $\omega_1^2-\omega_2^2$ with respect to frequency. For example, in the exemplary embodiment using 256 pt. FFT block 130a, the calculation in Eqn. 3 may be performed over 32 related outputs or frequency bin pairs of the 256 outputs from the FFT block 130a. The linear phase of the 32 resultant complex values are then graphed with respect to frequency and a linear slope of the graph is calculated. As noted above, this calculated linear slope is proportional to the value of β. This determined value is then used to calculate the coefficients associated with each frequency bin, which are input to the respective multipliers 134 shown in FIG. 5.

Another exemplary method for determining the value of β, without graphing the vectors, is shown in Eqn. 4, which provides that the estimate for chromatic dispersion is proportional to the angle of the sum of the differences for each calculation of the dot product from Eqn. 3 times the conjugate of the dot product shifted by Δf, over all selected frequencies. In this further exemplary embodiment, Eqn. 4 is implemented in the microprocessor 138 shown in FIG. 5. In practice, any method for calculating the linear slope of the dot product in Eqn. 3 with respect to frequency may be used to calculate the value for β, as would be understood by one of ordinary skill in the art.

$$CD \propto \text{angle}\left\{\sum_{all\ f} [A_U(f) \cdot A_L^*(f)] \cdot [A_U(f - \Delta f) \cdot A_L^*(f - \Delta f)]^*\right\} \quad \text{(Eqn. 4)}$$

As discussed above, the time-averaged value of the dot product in Eqn. 3 yields a linear phase component and a DC constant phase component. Since the value for β is determined from a slope of the linear phase of the dot product in Eqn. 3, the exemplary method effectively ignores the DC constant phase component, thus, the chromatic dispersion estimate is not sensitive to any static clock phase τ. Recovering the clock phase t enables the receiver clock to synchronize or "lock" with the clock of the transmitter of the received signal. Prior to "locking" the clock, however, the receiver clock may be offset from the transmit clock by up to 100 ppm, and in this case the clock phase τ may not be static. In other words, the 100 ppm difference may result in a statistical variation of the parameter 'τ' in the time averaging of the dot product of Eqn. 3 over a number of clock cycles. Therefore in practice, even though the exemplary method is insensitive to a static clock phase, the predetermined time or number of clock cycles used for averaging the dot product should be selected in consideration of the amount of clock offset.

For example, if averaging the dot product of Eqn. 3 for 64 clock cycles, results in a 2p rotation of the phase in each of the frequency components of Eqn. 3 with a 100 ppm clock offset, then the averaging in Eqn. 3 does not yield any useful information. Therefore, with a 100 ppm clock offset, the number of clock cycles used in the averaging step should be reduced to say 16 or less. In turn, the smaller the amount of clock offset, the greater the number of clock cycles can be used during the time-averaging step. This concept is discussed in greater detail with respect to the second embodiment below.

Figure 8:
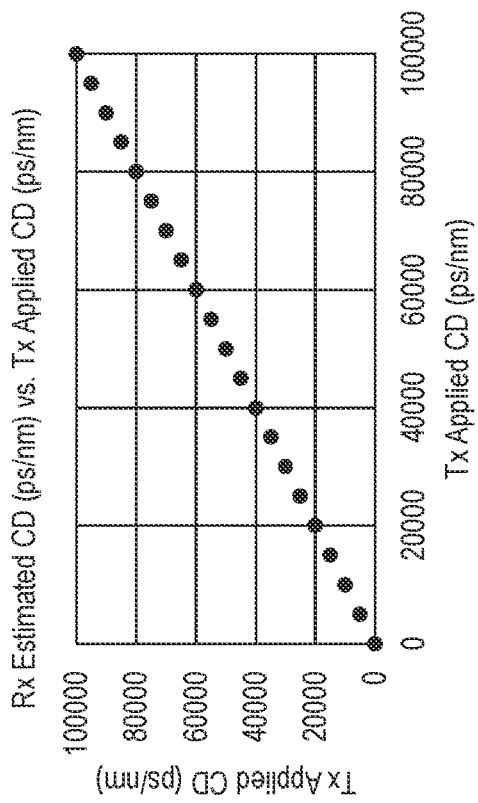
FIG. 8 is a graph of a proof-of-concept experimental result demonstrating the performance of the CD estimation determined with respect to the sample signal shown in FIGS. 6-7.
Figure 9:
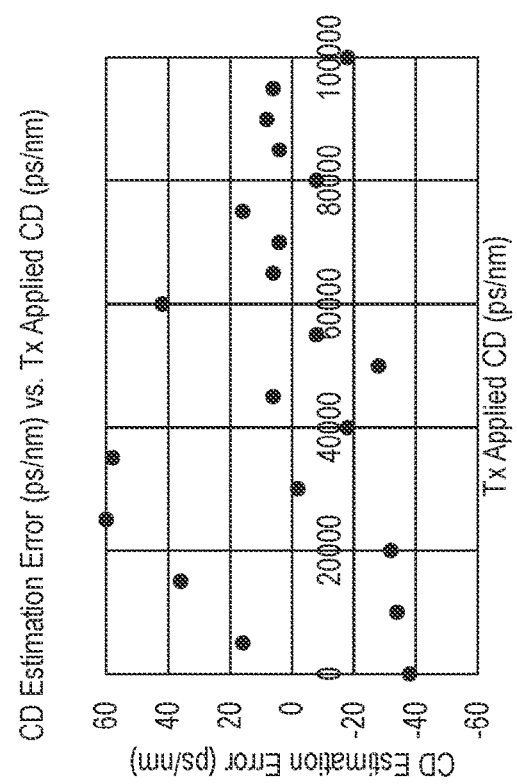
FIG. 9 is a graph of a modeled error of the CD estimation determined with respect to the sample signal shown in FIGS. 6-7.

When a 256 pt. FFT is used in a receiver consistent with an exemplary embodiment, the above estimate is satisfactory even if the receiver clock is not locked and there is 100 ppm offset. FIG. 8 depicts a proof-of-concept experimental result demonstrating the performance of the estimated chromatic dispersion in this embodiment without PMD or other polarization effects with respect to the actual chromatic dispersion for a QPSK modulated system, or any modulation format, considering 10 dB OSNR, 8 MHz LW, 1 GHz frequency offset and 512 clock average. In a 2× (2 times) over-sampled system using a 256 pt. FFT, each FFT produces an estimate with a variance=2340 ps/nm RMS. As shown in FIG. 8, the estimated chromatic dispersion in this exemplary embodiment is nearly the same as the actual chromatic dispersion itself. Further, FIG. 9 depicts the error of the estimated chromatic dispersion in this embodiment under the conditions described above. As shown in FIG. 9, the error is shown to have a range from approximately −38 ps/nm to approximately 60 ps/nm. As shown in FIGS. 8 and 9, the error may be independent of the actual amount of chromatic dispersion. Thus, it can be seen that the method demonstrates high accuracy regardless of the propagation distance from the fault 54.

The above disclosure provides exemplary embodiments for estimating a value of chromatic dispersion in an optical communication system for a single polarization signal. In the above embodiments, the received signal was modeled without considering the effect from PMD or other polarization rotation effects in the system. The results of the above exemplary embodiments can be extended to develop a chromatic dispersion estimate method that is insensitive to PMD in the optical communication system for a received signal with both X and Y polarizations. The individual steps of the following exemplary method are illustrated in the flow diagram of FIG. 12, and are referred to throughout.

Figure 12:
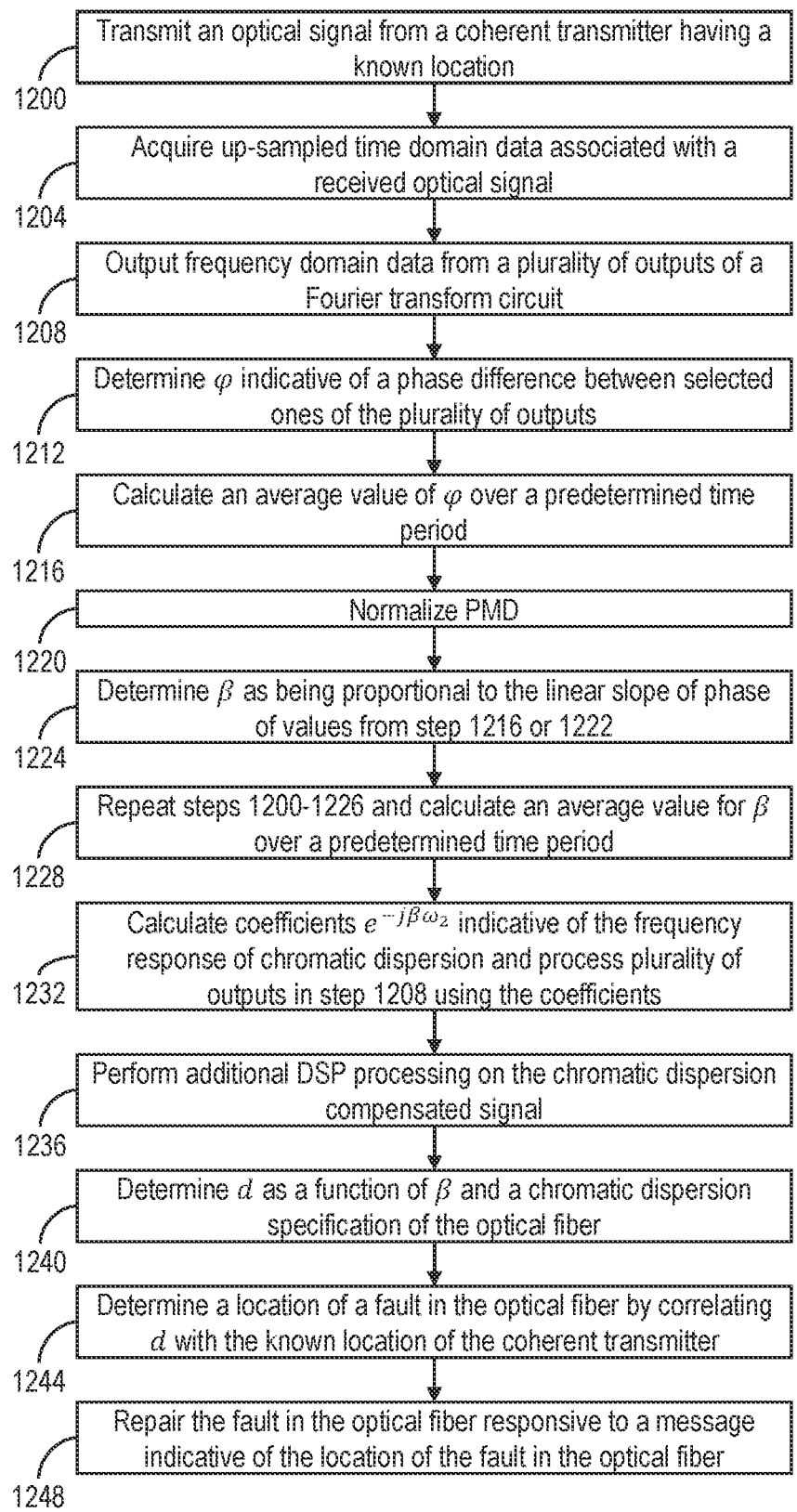
FIG. 12 is a process flow diagram of an exemplary embodiment of a fiber cut/fault localization method consistent with an aspect of the present disclosure.

Referring now to FIG. 12, an exemplary embodiment of the method may begin by transmitting the first optical signal 30a from the coherent transmitter module 22 having a known first location, as shown in step 1200. The first known location may be designated in X, Y coordinates of where the coherent transmitter module 22 is located on the Earth. In some embodiments, the X, Y coordinates may be latitude and longitude coordinates. In certain embodiments, the first optical signal 30a may be provided with customer data. If the microprocessor 138 detects a loss of the first optical signal 30a, the microprocessor 138 may provide a control signal to the coherent transmitter module 22 to cause the coherent transmitter module 22 to transmit the first optical signal 30a devoid of customer data. Upon encountering the fault 54 and being reflected, the second optical signal 30b, being a reflection of the first optical signal 30a devoid of customer data, may be detected by the coherent receiver module 26, and the microprocessor 138 may perform the remaining steps of the exemplary method as described below.

With respect to steps 1204 and 1208, a received signal is detected in the coherent receiver module 26, shown in FIG. 5, and is up-sampled by the A/D circuits 122. The up-sampled digital signal is transformed into the frequency domain using FFT blocks 130, as noted above. FIG. 7 illustrates the data spectra for a two-polarization multiplexed signal which is used to expand the above exemplary embodiment that assumes no PMD, to a further exemplary embodiment where PMD effects are not negligible. The received data spectrum, according to this embodiment, includes both X and Y polarization components, which "overlap" as shown in FIG. 7. Similar to the discussion with respect to FIG. 6, the 2× (2 times) up-sampled data spectra for both the X and Y polarization can be represented as shown. Once again, in the 2× up-sampled spectrum, $A_{xu}$ and $A_{XL}$ include the copied data spectrum from $X_U$, and $A_{YU}$ and $A_{YL}$ include the copied data spectrum from $Y_U$, the copied data spectrum being offset by a value indicative of the baud frequency.

To demonstrate that the exemplary embodiment is insensitive to PMD, the received up-sampled signals are modeled including the effects of PMD and any other polarization rotation effects. As would be understood by one of ordinary skill in the art, the polarization rotations of the transmitted signal can be modeled using a Jones matrix as shown in Eqn. 5. Accordingly, as shown in the matrix representation of Eqn. 5 below, for the dual polarized signal, $A_{XU}$ is modeled as a function of $X_U$ and $Y_U$ times the corresponding elements in the Jones matrix, which is used to model the PMD in the optical communication system. In Eqn. 5 below, $\phi$ represents the phase of the received signal and $\theta$ represents the polarization rotations of the received signal. The expanded form of the matrix representation in Eqn. 5 is shown in Eqn. 6 and Eqn. 8, below.

$$\begin{bmatrix} Axu \\ Ayu \end{bmatrix} = \begin{bmatrix} \cos\theta \cdot e^{-j\phi} & -\sin\theta \\ \sin\theta & \cos\theta \cdot e^{+j\phi} \end{bmatrix} \begin{bmatrix} Xu \\ Yu \end{bmatrix} \quad \text{(Eqn. 5)}$$

The above matrix notation can be similarly applied to model the received $A_{XL}$ and $A_{YL}$ signals, which are expressed in expanded form in Eqn. 7 and Eqn. 9, respectively. The expressions for $A_{XL}$ and $A_{YL}$ differ from $A_{XU}$ and $A_{YU}$ only in the subscripts for $\phi$ and $\theta$. This should be evident since $A_{XL}$ contains the same data spectrum as $A_{XU}$, and $A_{YL}$ contains the same data spectrum as $A_{YU}$, except that they are shifted by a frequency proportional to the up-sampling rate represented in FIG. 7. The most general description of PMD is that it causes a different amount of polarization rotation induced on the signal at different frequencies. In Eqns. 6-9 below, the frequency component in the upper side band is rotated by $\phi_1$ and $\theta_1$ and the frequency component in the lower side band is rotated by $\phi_2$ and $\theta_2$. Thus, when considering the effects of PMD and/or other polarization rotation effects in the optical communication system, the upper and lower side bands for each of the X and Y polarized sample signals in the frequency domain can be written as shown below, where [1] indicates the frequency bin index of the FFT blocks, and $\phi_U$ is a shorthand notation representing the expression for $$e^{j\beta\omega_1^2}e^{-j\tau\cdot\omega_1}$$

similar to Eqn. 1, and $\phi_L$ is a shorthand notation representing the expression for $$e^{j\beta\omega_2^2}e^{-j\tau\cdot\omega_2}$$

similar to Eqn. 2. Similar to the first exemplary embodiment, the expressions for $B_{XU}$, $B_{XL}$, $B_{YU}$, and $B_{YL}$, which are copies of the lower side band data spectrum of X and Y, respectively, can be written using the expressions shown in Eqns. 6-9, respectively, by substituting $X_L$ for $X_U$ and $Y_L$ for $Y_U$.

$A_{XU}[1]=(X_U[1]\cos\theta_1 e^{-j\phi_1}-Y_U[1]\sin\theta_1)\cdot e^{j\phi_U}$ (Eqn. 6)

$A_{XL}[1]=(X_U[1]\cos\theta_2 e^{-j\phi_2}-Y_U[1]\sin\theta_2)\cdot e^{j\phi_L}$ (Eqn. 7)

$A_{YU}[1]=(X_U[1]\sin\theta_1+Y_U[1]\cos\theta_1 e^{+j\phi_1})\cdot e^{j\phi_U}$ (Eqn. 8)

$A_{YL}[1]=(X_U[1]\sin\theta_2+Y_U[1]\cos\theta_2 e^{+j\phi_2})\cdot e^{j\phi_L}$ (Eqn. 9)

The steps described in the first embodiment, in which PMD effects were ignored, are used to estimate the chromatic dispersion in the present exemplary embodiment. The desired value for estimating the chromatic dispersion in this embodiment, however, is '$\phi_U$-$\phi_L$'. Specifically, as shown in step 1212, the phase difference represented by '$\phi_U$-$\phi_L$' is preferably detected for each of the desired frequency bins. As can be inferred from the first embodiment, the linear phase of this term is proportional to the chromatic dispersion coefficient $\beta$, and the DC value of this term is proportional to the clock phase $\tau$. As an illustrative example, in this embodiment the upper side band ($A_{XU}$, $A_{YU}$) and lower side band ($A_{XL}$, $A_{YL}$) differ by 10 GHz, as shown in FIG. 7, and thus, for large PMD, any polarization rotations are different across the 10 GHz band. The expressions '$\theta_1$, $\phi_1$' and '$\theta_2$, $\phi_2$' are used to model the polarization effects in the optical communication system according to the Jones matrix. Each frequency bin of an exemplary 256 pt. FFT has different values for $\phi$ and $\theta$, but as demonstrated below, these values are normalized out of the equations.

To solve for the desired value '$\phi_U$-$\phi_L$', the above signals are multiplied using a dot product similar to that shown with respect to Eqn. 3 of the previous embodiment. Using Eqns. 6-9, there are four (4) dot product calculations that are performed that result in the desired term '$\phi_U$-$\phi_L$'. For example, the dot product of AXU and the complex conjugate of AXL results in the desired term '$\phi_U$-$\phi_L$'. The resultant vector of this dot product contains a component of $|X_U(f)|^2$, $|Y_U(f)|^2$, and $X_U(f)\cdot Y_U^*(f)$, each of which may appear very noisy. As discussed with respect to the previous embodiment, and shown in step 1216, by time averaging these resultant vectors over a desired number of clock cycles, the above components of the data spectra are normalized out of the system. For instance, by utilizing a sufficient number of clock cycles, the components for $|X_U(f)|^2$ and $|Y_U(f)|^2$ approach a value of 1. In the exemplary embodiment, 64 clock cycles are used in the averaging step.

Further, the value for $X_U(f)\cdot Y_U^*(f)$ estimates to zero (0), since these signals are orthogonal to each other and do not correlate. Accordingly, no phase information is preserved for these components and the polarization representations of these components can be disregarded. The time averaged dot product for $A_{XU}$ and the complex conjugate of $A_{XL}$ for each frequency bin is represented in the simplified expression of Eqn. 10. Similar steps to those described above are performed to calculate the time averaged dot product $A_{YU}$ and the complex conjugate of $A_{YL}$, which results in the simplified expression of Eqn. 11. The other two dot products that provide the desired term '$\phi_U$-$\phi_L$' are simplified in Eqns. 12 and 13.

$$\left\langle A_{XU}\cdot A_{XL}^* \right\rangle_{(\phi_U-\phi_L)} = (\cos\theta_1\cos\theta_2 e^{j(\phi_2-\phi_1)}+\sin\theta_1\sin\theta_2)\cdot e^{j} \quad \text{(Eqn. 10)}$$

$$\left\langle A_{YU}\cdot A_{YL}^* \right\rangle_{(\phi_U-\phi_L)} = (\cos\theta_1\cos\theta_2 e^{j(\phi_1-\phi_2)}+\sin\theta_1\sin\theta_2)\cdot e^{j} \quad \text{(Eqn. 11)}$$

$$\left\langle A_{XU}\cdot A_{YL}^* \right\rangle \cdot e^{j(\phi_U-\phi_L)} = (\cos\theta_1\sin\theta_2 e^{-j\phi_1}-\sin\theta_1\cos\theta_2 e^{-j\phi_2}) \quad \text{(Eqn. 12)}$$

$$\left\langle A_{YU}\cdot A_{XL}^* \right\rangle_{(\phi_U-\phi_L)} = (\sin\theta_1\cos\theta_2 e^{j\phi_2}-\cos\theta_1\sin\theta_2 e^{j\phi_1})\cdot e^{j} \quad \text{(Eqn. 13)}$$

Similar to the example signal in FIG. 6, and as discussed above, the data spectra for $X_U$ and Yu are averaged out over time and may be disregarded here. From Eqns. 10-13, the desired value '$\phi_U$-$\phi_L$' may be difficult to solve due to the presence of the PMD effects modeled by the terms '$\theta_1$, $\phi_1$' and '$\theta_2$, $\phi_2$'. The above equations however, represent a linear system, the solution of which can be determined by calculating the determinant of a 2×2 matrix representing the polarization rotations in the linear system of Eqns. 10-13. As would be understood by one of ordinary skill in the art, the determinant of a 2×2 matrix is calculated by multiplying the first diagonal components and subtracting from this value the product of the second diagonal components. Eqn. 14 represents the result of multiplying the first diagonal components of a matrix representing the linear system together and Eqn. 15 represents the result of multiplying the second diagonal components together. Eqn. 16 represents the result of subtracting Eqn. 15 from Eqn. 14, and represents the determinant of the matrix representing the linear system above.

$$\langle A_{XU} \cdot A_{XL}^* \rangle \cdot \langle A_{YU} \cdot A_{YL}^* \rangle = (\cos\theta_1\cos\theta_2 e^{j(\phi_2-\phi_1)} + \sin\theta_1\sin\theta) \cdot \quad \text{(Eqn. 14)}$$
$$(\cos\theta_1\cos\theta_2 e^{j(\phi_1-\phi_2)} + \sin\theta_1\sin\theta_2) \cdot$$
$$e^{j2(\phi_U-\phi_L)}$$
$$= (\cos\theta_1^2\cos\theta_2^2 + \sin\theta_1^3\sin\theta_2^2 +$$
$$\sin\theta_1\sin\theta_2\cos\theta_1\cos\theta_2(e^{j(\phi_1-\phi_2)} +$$
$$e^{j(\phi_2-\phi_1)})) \cdot e^{j2(\phi_U-\phi_L)}$$

$$\langle A_{XU} \cdot A_{YL}^* \rangle \cdot \langle A_{YU} \cdot A_{XL}^* \rangle = (\cos\theta_1\sin\theta_2 e^{-j\phi_1} - \sin\theta_1\cos\theta_2 e^{-j\phi_2}) \cdot \quad \text{(Eqn. 15)}$$
$$(\sin\theta_1\cos\theta_2 e^{j\phi_2} - \cos\theta_1\sin\theta_2 e^{j\phi_1}) \cdot$$
$$e^{2j(\phi_U-\phi_L)}$$
$$= (\sin\theta_1\sin\theta_2\cos\theta_1\cos\theta_2(e^{j(\phi_2-\phi_1)} +$$
$$e^{j(\phi_1-\phi_2)}) - \sin\theta_1^2\cos\theta_2^2 -$$
$$\sin\theta_2^2\cos\theta_1^2) \cdot e^{2j(\phi_U-\phi_L)}$$

$$\begin{aligned}\langle A_{XU} \cdot A_{XL}^* \rangle \cdot \langle A_{YU} \cdot A_{YL}^* \rangle - \\ \langle A_{XU} \cdot A_{YL}^* \rangle \cdot \langle A_{YU} \cdot A_{XL}^* \rangle\end{aligned} = (\cos\theta_1^2\cos\theta_2^2 + \sin\theta_1^2\sin\theta_2^2 + \quad \text{(Eqn. 16)}$$
$$\sin\theta_1^2\cos\theta_2^2 + \sin\theta_2^2\cos\theta_1^2) \cdot$$
$$e^{2j(\phi_U-\phi_L)}$$
$$= (\cos\theta_1^2 + \sin\theta_1^2)(\cos\theta_2^2 + \sin\theta_2^2) \cdot$$
$$e^{2j(\phi_U-\phi_L)}$$
$$= 1 \cdot e^{2j(\phi_U-\phi_L)}$$

With respect to step 1220, and as shown in the simplified expression of Eqn. 16, by calculating the determinant function of the modeled system, the PMD effects (i.e., those represented by '$\theta_1, \phi_1$,' and '$\theta_2, \phi_2$') are normalized out of the system. The resultant value provides the expression for determining the value for the chromatic dispersion in the optical communication system.

This above result follows from the known properties of a Jones matrix. For instance, Eqn. 17, demonstrates that the determinant of a Jones matrix is consistent with the above result.

$$\det\left\{\begin{bmatrix}\cos\theta \cdot e^{-j\phi} & -\sin\theta \\ \sin\theta & \cos\theta \cdot e^{+j\phi}\end{bmatrix}e^{j\alpha}\right\} = e^{2j\alpha} \quad \text{(Eqn. 17)}$$

The above property of a Jones matrix shown in Eqn. 17, which is used to accurately model the effects of PMD in this exemplary embodiment, enables the exemplary method to demonstrate that the estimate for the chromatic dispersion in the optical communication system is insensitive to any PMD effects. From the result in Eqn. 16, the modeled linear phase difference is twice the linear phase difference used for the estimate of β in the first embodiment. Thus, using the result from Eqn. 16, the chromatic dispersion in a dual polarization multiplexed signal can be estimated as similarly discussed with respect to the first embodiment.

For instance, a time averaged value of each of the dot products in Eqns. 10-12, over a desired number of clock cycles, represented as $\langle A_{XU} \cdot A_{XL}^* \rangle$, $\langle A_{YU} \cdot A_{YL}^* \rangle$, $\langle A_{XU} \cdot A_{YL}^* \rangle$, and $\langle A_{YU} \cdot A_{XL}^* \rangle$ can be collected for a desired number of frequency components of the transformed received signal. The expression below (Eqn. 18) for λ(f) reflects this quantity for the determined phase difference with respect to frequency. The same expression can be generated for $B_{XU}$, $B_{XL}$, $B_{YU}$, and $B_{YL}$ using the above steps.

$$\lambda(f) = \frac{\langle A_{XU} \cdot A_{XL}^* \rangle \cdot \langle A_{YU} \cdot A_{YL}^* \rangle - \langle A_{XU} \cdot A_{YL}^* \rangle}{\langle A_{YU} \cdot A_{XL}^* \rangle} \quad \text{(Eqn. 18)}$$

Using the result from Eqn. 16, and representing $e^{j\beta(\omega_1^2-\omega_2^2)}e^{-j\tau \cdot (\omega_1-\omega_2)}$ by $e^{j(\phi_U-\phi_L)}$, it can be shown that the linear phase component of λ(f) is proportional to the chromatic dispersion coefficient β, and the DC constant portion of λ(f) is proportional to the clock phase τ. From the result in Eqn. 16, the phase detected for λ(f) is multiplied by a factor of 2, thus, the following expression (Eqn. 19) can be written for the detected phase of λ(t):

$$2\beta(\omega_1^2-\omega_2^2) + 2\tau(\omega_1-\omega_2) \propto \angle \lambda(f) \quad \text{(Eqn. 19)}$$

As similarly described with respect to the first embodiment, the angle of λ(f) is calculated by determining the rate of change of the phase difference of λ(f) with respect to frequency ($\omega_1^2-\omega_2^2$). According to one exemplary embodiment, which uses 256 pt. FFT blocks 130 as shown in FIG. 5, 32 frequency bins may be selected for each of the upper and lower side bands of the X and Y polarized signals. Thus, in this exemplary embodiment, 32 pairs of bins are used to arrive at 32 complex values represented by λ(f) defined in Eqn. 18. The phase of the complex values may then be graphed as a function of frequency to calculate the linear slope. As shown in Eqn. 19, the calculated linear slope is proportional to the value for β by a factor of 2. Thus, to estimate the value of β, the calculated slope is divided by 2.

A mathematical expression used in an exemplary embodiment for determining the linear slope of phase of λ(f) with respect to frequency as described in step 1224, is provided below in Eqn. 20. Similar to Eqn. 4 discussed above, Eqn. 20 provides that the estimate for chromatic dispersion is proportional to the angle of the sum of the differences of λ(f) times the conjugate of λ(t) shifted by Δf, for frequencies from f=0 to $f_{samp}/2$, where $f_{samp}$ is the sampling frequency. In an exemplary embodiment, Eqn. 20 is implemented in the microprocessor 138 shown in FIG. 5. In practice, however, any method for calculating the linear slope of phase of λ(f) with respect to frequency $\omega_1^2-\omega_2^2$ may be used to calculate the value for β, as would be understood by one of ordinary skill in the art.

$$\beta \propto \text{angle}\left[\sum_{f=0}^{f_{samp}/2} \lambda(f)\lambda^*(f-\Delta f)\right] \quad \text{(Eqn. 20)}$$

Using Eqn. 20, the calculation for determining the coefficients to compensate for the chromatic dispersion in the optical communication system is straightforward and depends on the actual implementation. With respect to step 1232, using the value for β, the coefficient for each frequency sample is represented by the inverse frequency response $e^{-j\beta\omega^2}$ of the chromatic dispersion and can be calculated for each sampled frequency of the 256 outputs from FFT blocks 130. These coefficients are input to the multipliers 134 shown in FIG. 5.

Figure 11:
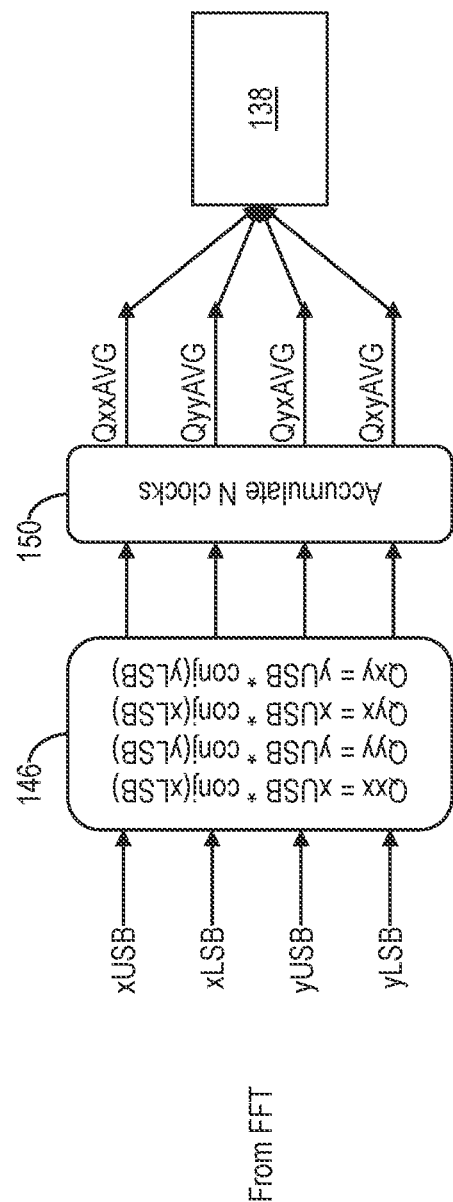
FIG. 11 is a block diagram of a CD estimation circuit constructed in accordance with the present disclosure.

In the coherent receiver module 26 shown in FIG. 5, the chromatic dispersion estimate block 142 (hereinafter "CD estimate block 142") is preferably configured entirely in hardware within the RX DSP 126 in order to perform the desired functionality in the required amount of time. FIG. 11 depicts a block diagram of the functionality of the CD estimate block 142 shown in FIG. 5. In this exemplary embodiment, the FFT blocks 130 output 256 frequency domain data samples of the received signal for each clock cycle in the receiver. For each clock cycle, 32 upper-side band (hereinafter "USB") bins and 32 lower-side band (hereinafter "LSB") bins for each of the X and Y polarized signals are used to perform the chromatic dispersion estimate. A circuit represented by block 146 calculates the dot products represented in Eqns. 10-13, for each frequency bin, denoted by $Q_{xx}$, $Q_{yy}$, $Q_{yx}$, and $Q_{xy}$.

As shown in FIG. 11, a second block 150 calculates the average of each of these values over a desired number of clock cycles. Block 150 is programmable to compute the average values over a desired number of clock cycles such as 4, 8, 16, 32, or 64, or more depending on the embodiment. As discussed above with respect to the first embodiment, the number of clock cycles used to compute the average should be chosen so that the channel of the received signal is relatively static within the predetermined averaging time—this includes clock phase stability and polarization variations. PMD in the optical communication system may change over time, that is, the polarization of the received optical signals may rotate. These polarization variations occur on the order of microseconds; thus it is desirable to calculate the time average in less than a microsecond. Variations in the clock phase, however, can occur much faster, thus additional consideration is taken to ensure the averaging occurs over a duration in which the clock phase also appears static.

As previously discussed, the exemplary method of estimating chromatic dispersion is insensitive to a static clock phase. However, as discussed below, one of the advantages of the exemplary method is that chromatic dispersion can be estimated prior to "locking" the clock in the receiver. In some optical communication systems, however, without "locking" the clock there may be a large offset between the receiver clock and the transmit clock. Most practical crystal oscillators (clocks) used in the transmitters and receivers in conventional optical systems can maintain an unlocked frequency offset less than 100 ppm. Thus, as an example, at a clock offset of 100 ppm, and using a 256 pt. FFT (which corresponds to 64 output data symbol pairs), the exemplary method may require on the order of 16 clock cycles for averaging. For instance, in each clock cycle, 64 symbol calculations are executed, for a duration of 16 clocks. With a clock offset of 100 ppm, the exemplary method yields an average clock phase shift of 0.1 symbol intervals (or 0.1 UI) over the 16 clock cycles. An average clock phase shift 0.1 UI in the averaging step will still provide a reliable result in most embodiments. Alternatively, if clock is already locked, then the averaging can be performed over a longer period of time.

As fewer clock cycles are used in the averaging step, the estimated value for chromatic dispersion will yield a less accurate result. Since the averaging step in the RX DSP 126 must occur relatively fast, further averaging of the chromatic dispersion is provided in the microprocessor 138. As further shown in FIGS. 5 and 11, in an exemplary embodiment consistent with the disclosure, the averaged values $Q_{xxAVG}$, $Q_{yyAVG}$, $Q_{yxAVG}$, and $Q_{xyAVG}$ are read by microprocessor 138 and provided externally to the RX DSP 126. The microprocessor 138 preferably comprises software to calculate the values for β using Eqns. 18-20, as discussed above.

In an exemplary embodiment described with respect to step 1228, the value for β is further averaged in the microprocessor 138 over a desired number of determined values for β. For example, after every predetermined number clock cycles used in the averaging step, in consideration of the above, a new value for β is calculated. In one embodiment, microprocessor 138 determines 50 successive values of β and determines an average value for β that is used to calculate the coefficients input at multipliers 134 for chromatic dispersion compensation. Since the value for chromatic dispersion changes relatively slowly in an optical communications system, it is reasonable to average the value of β over an extended period. The number of values of β used to calculate the average β will depend on a number of design choices. For instance, the exemplary embodiment only uses 32 pairs of the 256 frequency bins to calculate the estimate for β. While an exemplary embodiment uses only 32 pairs of bins, an exemplary receiver may be configured to use any desired number of frequency bins to estimate the chromatic dispersion. The greater the number of frequency bin pairs utilized, the more accurate the value for β will be for each estimate. Since the value for β in the exemplary embodiment is further averaged over time in microprocessor 138, in an exemplary embodiment, it is sufficient to use only 32 pairs of the bins to estimate a single value for β. As further discussed below, the exemplary embodiment utilizes 32 select frequency bin pairs in consideration of the requirements of an exemplary clock recovery circuit.

The microprocessor 138 then provides the calculated coefficients for β to the multipliers 134. The output of multipliers 134 are then supplied to the function block 154 which performs a number of other DSP functions on the chromatic dispersion compensated signal, as shown in step 1236. Some of the other exemplary DSP functions performed in the function block 154 are described in a paper contributed in part by the Applicants titled *Performance of Dual-Polarization QPSK for Optical Transport Systems*, published in the *Journal of Lightwave Technology*, Vol. 27, No. 16, Aug. 15, 2009.

In an exemplary embodiment described with respect to step 1240, upon determining β or an average value of β in step 1224 or step 1228, respectively, the microprocessor 138 may use β in order to determine a distance travelled by a received optical signal through one or more optical links 18 (e.g., the downlink 18a, the uplink 18b, and/or the bidirectional link 18c, as shown in FIGS. 2-3). In certain embodiments, the microprocessor 138 transmits β to the function block 154 for further processing, as described herein. A mathematical expression using an exemplary embodiment for determining the distance traveled by the received optical signal as described in step 1240, as provided below in Eqn. 21. In an exemplary embodiment, Eqn. 21 is implemented in the microprocessor 138 shown in FIG. 5. In practice, however, any method for calculating the distance traveled by the received optical signal may be used to calculate the value for d, as would be understood by one of ordinary skill in the art.

In another exemplary embodiment described with respect to step 1240, the microprocessor 138 transmits the value of β from a networking port 180 (shown in FIG. 1) to a network host device 182 (shown in FIG. 1) having a host processor 186 (shown in FIG. 1) so that the host processor 186 may use 13 in order to determine a distance travelled by a received optical signal through one or more optical links 18 (e.g., the downlink 18a, the uplink 18b, and/or the bidirectional link 18c, as shown in FIGS. 2-3). In doing so, the host processor 186 may include a compensation factor to negate the effects of any chromatic dispersion compensation elements included in the optical network 10.

$$d = \frac{\beta(\text{ps/nm})}{CD_{spec.}(\text{ps/nm} * \text{km})} \quad \text{(Eqn. 21)}$$

Eqn. 21 provides that the distance traveled by the received optical signal may be determined by dividing β by $CD_{spec.}$, where $CD_{spec.}$ is a chromatic dispersion specification (i.e., an amount of chromatic dispersion per unit length) of the fiber optic cable. In one non-limiting example, a fiber optic cable may have a chromatic dispersion specification of less than 18.0 ps/(nm·km) when transmitting an optical signal with a 1550 nm wavelength. In another non-limiting example, fiber-optic cable may have a chromatic dispersion specification of less than 22.0 ps/(nm·km) when transmitting an optical signal with a 1625 nm wavelength.

Having determined the distance d traveled by the received optical signal, and knowing a first location of the coherent transceiver 14 that transmitted the received optical signal (e.g., the first coherent transceiver 14a and/or the second coherent transceiver 14b shown in FIG. 1), the microprocessor 138 may determine a second location of the fault 54 in the fiber optic cable by correlating d with the known first location as described in step 1244. By dividing d by 2, the microprocessor 138 may determine the distance traveled by the received optical signal before encountering the fault 54 and being reflected. The microprocessor 138 may then use this distance, along with the known first location, to determine the second location. With respect to step 1248, the microprocessor 138 may finally generate a message (e.g., an alert) indicative of the second location so that a user may repair, or direct another to repair, the fault 54 in the fiber optic link.

In another exemplary embodiment, the host processor 186, having determined the distance d traveled by the received optical signal, and having network topology information 194 (shown in FIG. 1) stored in a non-transitory computer readable medium 190 (shown in FIG. 1) (hereinafter "host memory 190") (e.g., one or more geographical location of the coherent transceivers 14 connected to the optical network 10 and/or one or more path defined by the placement of the optical links 18), may determine a second location of the fault 54 in the fiber optic cable by correlating d with the network topology information 194. By dividing d by 2, the host processor 186 may determine the distance traveled by the received optical signal before encountering the fault 54 and being reflected. The host processor 186 may then use this distance, along with the network topology information 194, to determine geographic coordinates of the second location. With respect to step 1248, the host processor 186 may finally generate a message (e.g., an alert) indicative of the second location so that a user may repair, or direct another to repair, the fault 54 in the fiber optic link.

With respect to FIGS. 5 and 11, it should be evident to one skilled in the art that any of the above-described hardware devices may be implemented as one or more software modules in order to perform the operations of the above-described embodiments. For instance, while the FFT blocks 130 are shown comprised in the RX DSP 126, these circuits may be realized in software alone, or a combination of software and hardware. Additionally, any of the described software components may also be realized in one or more hardware components for performing the desired functionality.

Figure 10:
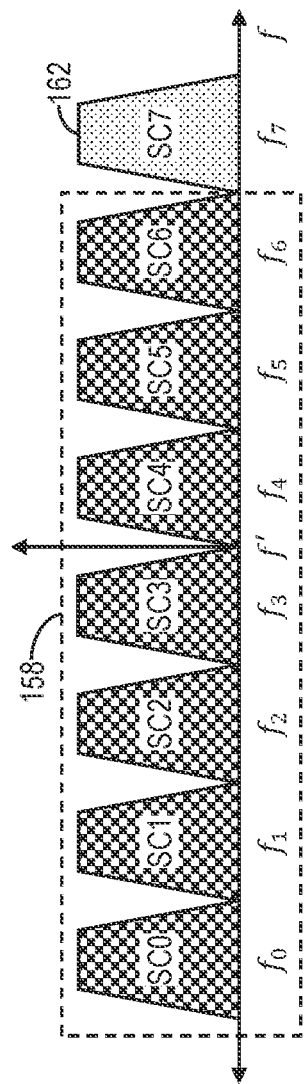
FIG. 10 is a diagram of an exemplary embodiment of an optical signal having multiple subcarriers consistent with an aspect of the present disclosure.

Referring now to FIG. 10, shown therein is a diagram of an exemplary embodiment of a plurality of subcarriers SC0 to SC7 that may be output by the coherent transmitter module 22 of a coherent transceiver 14 consistent with an aspect of the present disclosure. While the plurality of subcarriers SC0 to SC7 are depicted as comprising seven subcarriers, any number of subcarriers may be output by the coherent transmitter module 22. Each of subcarriers SC0 to SC7 may have a corresponding one of a plurality of frequencies $f_0$ to $f_7$. In addition, each of subcarriers SC0-SC7 may be a Nyquist subcarrier. A Nyquist subcarrier is a bandwidth of optical signals carrying data, wherein (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier SC may have an optical spectral bandwidth that is at least equal to the Nyquist frequency, as determined by the baud rate of such subcarrier.

As discussed in greater detail above, optical subcarriers SC0 to SC7 are generated by modulating light output from a laser. The frequency of such laser output light is f' and is typically a center frequency such that half of the subcarrier frequencies (e.g., $f_4$ to $f_7$), are above f' and half of the subcarrier frequencies (e.g., $f_0$ to $f_3$) are below f'.

In certain embodiments, subcarriers SC0-SC6 are designated as data subcarriers 158 while subcarrier SC7 is designated as an auxiliary subcarrier 162. In one embodiment, the steps 1204 to 1244 as shown in FIG. 12 may be performed by the microprocessor 138 on the auxiliary subcarrier 162. That is, the microprocessor 138 may analyze the auxiliary subcarrier 162 of the received optical signal in order to determine the chromatic dispersion and/or the location of the fault 54 simultaneously with the transmission of customer data on the data subcarriers 158. In one embodiment, the data subcarriers 158 have a first baud rate and the auxiliary subcarrier 162 has a second baud rate that is different from the first baud rate. However, in other embodiments, in a normal mode of operation both the data subcarriers 158 and the auxiliary subcarrier 162 have the first baud rate until the microprocessor 138 detects the fault 54 (e.g., via an alarm, loss of signal (LOS) or any other mechanism) in the fiber optic cable, at which point the microprocessor 138 switches to a fault detection mode enabling localization of the fault 54. In the fault detection mode, the microprocessor 138 adjusts the auxiliary subcarrier 162 such that the auxiliary subcarrier 162 has the second baud rate and then determines the chromatic dispersion in the auxiliary subcarrier 162 having the second baud rate. In one embodiment, the second baud rate is lower than the first baud rate. While subcarrier SC7 is shown in FIG. 10 as the auxiliary subcarrier 162, those having ordinary skill in the art will understand that any of the subcarriers SC0-SC7 may be designated as the auxiliary subcarrier 162.

In certain embodiments, the coherent receiver module 26 shown in FIG. 5 may further comprise one or more non-transitory computer readable medium 166 (hereinafter "memory 166") storing processor-executable code 170 that when executed causes the microprocessor 138 to perform each of the steps 1204 to 1244 as shown in FIG. 12. In other embodiments, each of the coherent transceivers 14 further comprise a controller 174, and the controller 174 comprises a processor 178 and the memory 166 storing the processor-executable code 170. In certain embodiments, the processor-executable code 170 may cause the processor 178 to be operable to work together with the microprocessor 138 to provide the functionality as described above. While the controller 174 is depicted as being included within the coherent transceivers 14, in certain embodiments, the controller 174 may be separate from the coherent transceivers 14.

For example, in some embodiments, in the normal mode of operation, the coherent transmitter module 22 is directed by the processor 178 to transmit the first optical signal 30a having customer data via the optical link 18 (e.g., the downlink 18a, the uplink 18b, and/or the bidirectional link 18c). Upon the processor 178 detecting a loss of the first optical signal 30a having the customer data, the processor 178 switches to the fault detection mode and thereby provides a control signal to the coherent transmitter module 22 to cause the coherent transmitter module 22 to transmit the first optical signal 30a devoid of customer data to assist in obtaining a location of the fault 54. At this point, the first optical signal 30a devoid of customer data may be provided with a different (e.g., lower) baud rate. The processor 178 and/or the processor 138 detects the second optical signal 30b, being a reflection of the first optical signal 30a devoid of customer data, via the coherent receiver module 26, and determines a chromatic dispersion of the second optical signal 30b as discussed above. Then, the processor 178 and/or the processor 138 correlates the chromatic dispersion with known parameters indicative of an amount of chromatic dispersion per unit length of the fiber optic link to determine a distance travelled by the first optical signal 30a devoid of customer data and the second optical signal 30b. Upon remediation of the fault 54, the processor 178 may then send a control signal to the coherent transmitter module 22 to resume transmission of the first optical signal 30a carrying the customer data. The normal mode of operation and the fault detection mode described above can be executed simultaneously by including a combination of the data subcarriers 158 having the first data rate and the auxiliary subcarrier 162 having the second data rate in the first optical signal 30a. In other embodiments, the normal mode of operation and the fault detection mode can be executed separately by reducing the baud rate of at least one of the data subcarriers 158 and/or the auxiliary subcarrier 162 upon detection of the fault 54.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A method, comprising:
transmitting a first optical signal;
receiving a second optical signal, the second optical signal being a reflection of the first optical signal;
analyzing the second optical signal to determine a first parameter indicative of a chromatic dispersion of the second optical signal; and
determining a second parameter based on the first parameter, the second parameter indicative of a distance traveled by the first optical signal and the second optical signal through one or more fiber optic link, wherein the first optical signal is transmitted by a coherent transmitter having a known first location, and wherein the method further comprises:
determining a second location of a fault in the one or more fiber optic link by correlating the second parameter with the known first location; and
generating a message indicative of the second location.

2. The method of claim 1, wherein the method further comprises repairing the fault in the one or more fiber optic link.

3. The method of claim 1, wherein the first optical signal comprises one or more first data subcarrier and a first auxiliary subcarrier, the second optical signal comprises one or more second data subcarrier and a second auxiliary subcarrier, and the method further comprises:
detecting a fault in the one or more fiber optic link; and
adjusting an auxiliary baud rate of the first auxiliary subcarrier in response to detecting the fault in the one or more fiber optic link;
wherein analyzing the second optical signal comprises analyzing the second auxiliary subcarrier of the second optical signal.

4. The method of claim 1, wherein the first optical signal comprises one or more first data subcarrier and a first auxiliary subcarrier, the one or more first data subcarrier having a data baud rate and the first auxiliary subcarrier having an auxiliary baud rate different from the data baud rate, the second optical signal comprises one or more second data subcarrier and a second auxiliary subcarrier, and wherein the step of analyzing the second optical signal comprises analyzing the second auxiliary subcarrier of the second optical signal.

5. The method of claim 1, wherein the step of analyzing the second optical signal comprises:
supplying, from a plurality of outputs of a Fourier transform circuit, frequency domain data in response to time domain data associated with the second optical signal;
determining a third parameter based on a plurality of components of the frequency domain data supplied from selected ones of the plurality of outputs of the Fourier transform circuit, the third parameter being indicative of a phase difference between selected ones of the plurality of components; and
determining the first parameter based on the third parameter.

6. The method of claim 5, wherein the step of analyzing the second optical signal further comprises:
determining a frequency response of the chromatic dispersion based on the first parameter;
processing the plurality of outputs of the Fourier transform circuit based on the frequency response of the chromatic dispersion; and
calculating an average value of the third parameter over a predetermined time period;
wherein the time domain data has an associated baud rate, and selected ones of the plurality of outputs of the Fourier transform circuit are associated with components of the frequency domain data that are spectrally spaced from one another by the associated baud rate.

7. The method of claim 6, wherein the step of determining the frequency response of the chromatic dispersion comprises calculating a coefficient for each of the plurality of outputs of the Fourier transform circuit using the first parameter, the coefficients representing a frequency response of the chromatic dispersion.

8. The method of claim 7, wherein the coefficients are calculated using an averaged value of the first parameter based on a predetermined number of values of the first parameter determined over a predetermined period of time.

9. The method of claim 6, wherein the step of processing the plurality of outputs further comprises multiplying the plurality of outputs by an inverse frequency response based on a respective coefficient calculated for each of the plurality of outputs.

10. The method of claim 5, wherein the method further comprises:
generating an analog signal in response to the second optical signal;
sampling the analog signal at a sampling frequency; and
providing the time domain data in response to sampling the analog signal.

11. The method of claim 5, wherein the step of determining the third parameter comprises calculating a dot product of first and second ones of the plurality of components of the frequency domain data.

12. The method of claim 5, wherein the step of determining the first parameter comprises determining a linear phase of the third parameter, the linear phase being proportional to the first parameter.

13. A method, comprising:
transmitting, by a coherent transmitter, a first optical signal having customer data through a fiber optic link;
providing a control signal to the coherent transmitter to cause the coherent transmitter to transmit a second optical signal devoid of customer data;
detecting a reflection of the second optical signal via the coherent receiver;
determining a chromatic dispersion of the reflection of the second optical signal; and
correlating the chromatic dispersion with known parameters indicative of an amount of chromatic dispersion per unit length of the fiber optic link to determine a distance travelled by the second optical signal,
wherein the coherent transmitter has a known first location, and further comprising:
determining a second location of a fault in the fiber optic link by correlating the distance travelled by the second optical signal with the known first location; and
generating a message indicative of the second location.

14. The method of claim 13, wherein the first optical signal comprises one or more first data subcarrier and a first auxiliary subcarrier, the second optical signal comprises one or more second data subcarrier and a second auxiliary subcarrier, and further comprising:
adjusting an auxiliary baud rate of the second auxiliary subcarrier in response to detecting the loss of the first optical signal; and
wherein the step of determining the chromatic dispersion of the reflection of the second optical signal comprises determining the chromatic dispersion of the second auxiliary subcarrier of the reflection of the second optical signal.

15. The method of claim 13, wherein the second optical signal comprises one or more data subcarrier and an auxiliary subcarrier, the one or more data subcarrier having a data baud rate and the auxiliary subcarrier having an auxiliary baud rate different from the data baud rate, and wherein the step of determining the chromatic dispersion of the reflection of the second optical signal comprises determining the chromatic dispersion of the auxiliary subcarrier of the reflection of the second optical signal.

16. A method, comprising:
transmitting, by a coherent transmitter, a first optical signal having customer data through a fiber optic link in a normal mode of operation of the coherent transmitter, the customer data encoded in at least one data subcarrier of the first optical signal;
detecting a fault in the fiber optic link;
switching the coherent transmitter to a fault detection mode;
detecting a reflection of a second optical signal via a coherent receiver;
determining a chromatic dispersion of the reflection of the second optical signal; and
correlating the chromatic dispersion with known parameters indicative of an amount of chromatic dispersion per unit length of the fiber optic link to determine a distance travelled by the second optical signal.

17. The method of claim 16, wherein the coherent transmitter has a known first location, and further comprising:
determining a second location of a fault in the fiber optic link by correlating the distance travelled by the second optical signal with the known first location; and
generating a message indicative of the second location.

18. The method of claim 16, wherein the first optical signal includes at least one subcarrier having a first baud rate, and wherein the step of switching the coherent transmitter to a fault detection mode includes changing the first baud rate of the at least one subcarrier to a second baud rate less than the first baud rate.

* * * * *